United States Patent
Martin et al.

(10) Patent No.: US 9,303,731 B2
(45) Date of Patent: Apr. 5, 2016

(54) TRANSMISSION SYSTEM

(75) Inventors: William Wesley Martin, Milton Keynes (GB); Richard Neil Quinn, Milton Keynes (GB)

(73) Assignee: ZEROSHIFT TRANSMISSIONS LIMITED, Buckinghamshire (GB)

( * ) Notice: Subject to any disclaimer, the term of this patent is extended or adjusted under 35 U.S.C. 154(b) by 0 days.

(21) Appl. No.: 14/119,117

(22) PCT Filed: May 25, 2012

(86) PCT No.: PCT/GB2012/000465
§ 371 (c)(1),
(2), (4) Date: Jul. 25, 2014

(87) PCT Pub. No.: WO2012/164237
PCT Pub. Date: Dec. 6, 2012

(65) Prior Publication Data
US 2014/0326093 A1    Nov. 6, 2014

(30) Foreign Application Priority Data

May 27, 2011    (GB) .................................. 1109100.6

(51) Int. Cl.
*F16H 3/08* (2006.01)
*F16H 3/083* (2006.01)
(Continued)

(52) U.S. Cl.
CPC ................ *F16H 3/083* (2013.01); *F16D 11/10* (2013.01); *F16D 2011/008* (2013.01); *F16H 2003/007* (2013.01); *F16H 2063/3093* (2013.01); *Y10T 74/19233* (2015.01)

(58) Field of Classification Search
CPC . F16H 3/006; F16H 2003/0931; F16H 3/091; F16H 47/02

USPC .................................. 74/330, 331, 333, 340
See application file for complete search history.

(56) References Cited

U.S. PATENT DOCUMENTS

| 5,181,431 A | 1/1993 | Zaiser et al. |
| 5,367,914 A | 11/1994 | Ordo |

(Continued)

FOREIGN PATENT DOCUMENTS

| DE | 123398 C | 2/1901 |
| DE | 607182 | 12/1934 |

(Continued)

OTHER PUBLICATIONS

International Search Report for PCT/GB2012/000465 mailed on Sep. 24, 2012 in 2 pages.

(Continued)

*Primary Examiner* — Ha D Ho
(74) *Attorney, Agent, or Firm* — Knobbe, Martens, Olson & Bear, LLP

(57) ABSTRACT

A transmission system including a first input shaft (1) that is arranged to receive drive directly from a drive source (80), and a second input shaft (3) that is arranged to receive drive from the drive source via a drive interruption means (86), such as a friction clutch device, a first gear element (15) rotatable relative to the first input shaft (1) and a selector assembly (29) for selectively locking the first gear element (15) for rotation with the first input shaft (1) from operational modes that include the following modes: lock the gear element for rotation with the first input shaft in forward and reverse torque directions, lock the gear element for rotation with the first input shaft in the forward torque direction and not lock in the reverse torque direction; and lock the gear element with rotation with the first input shaft in the reverse torque direction and not lock in the forward torque direction. A method of performing a power on down shift is also provided.

48 Claims, 21 Drawing Sheets

(51) Int. Cl.
*F16D 11/10* (2006.01)
*F16H 3/00* (2006.01)
*F16H 63/30* (2006.01)
*F16D 11/00* (2006.01)

(56) References Cited

U.S. PATENT DOCUMENTS

| | | |
|---|---|---|
| 5,592,854 A | 1/1997 | Alfredsson |
| 5,679,099 A | 10/1997 | Kato et al. |
| 5,685,799 A | 11/1997 | Vukovich et al. |
| 5,767,420 A | 6/1998 | De Schepper et al. |
| 5,827,148 A | 10/1998 | Seto et al. |
| 5,950,781 A | 9/1999 | Adamis et al. |
| 6,019,010 A | 2/2000 | Trinder |
| 6,061,619 A | 5/2000 | Schmitz et al. |
| 6,062,118 A | 5/2000 | Lee |
| 6,209,407 B1 | 4/2001 | Heinzel et al. |
| 6,251,043 B1 | 6/2001 | Gierling |
| 6,296,412 B1 | 10/2001 | Bakker et al. |
| 6,505,504 B1 | 1/2003 | Chang et al. |
| 6,514,172 B2 | 2/2003 | Kayano et al. |
| 6,609,056 B1 | 8/2003 | Czarnecki et al. |
| 6,819,997 B2 | 11/2004 | Buchanan et al. |
| 6,820,512 B2 | 11/2004 | Hedman |
| 6,899,655 B2 | 5/2005 | Eggert et al. |
| 6,986,289 B2 | 1/2006 | Otto et al. |
| 7,066,043 B2 * | 6/2006 | Kim et al. .................. 74/330 |
| 7,261,379 B2 | 8/2007 | Volker et al. |
| 7,469,610 B2 | 12/2008 | Wittkopp |
| 7,563,200 B2 | 7/2009 | Martin |
| 7,563,201 B2 | 7/2009 | Martin |
| 7,770,480 B2 | 8/2010 | Martin |
| 7,841,252 B2 | 11/2010 | Remmler |
| 7,886,627 B2 | 2/2011 | Martin |
| 8,171,814 B2 | 5/2012 | Martin et al. |
| 8,291,784 B2 * | 10/2012 | Martin et al. .................. 74/329 |
| 2002/0134637 A1 | 9/2002 | Salecker et al. |
| 2002/0144563 A1 * | 10/2002 | Forsyth ....................... 74/333 |
| 2003/0010144 A1 | 1/2003 | Petzold |
| 2003/0084739 A1 | 5/2003 | Koerber et al. |
| 2003/0171186 A1 | 9/2003 | Okada et al. |
| 2004/0009840 A1 | 1/2004 | Lutz et al. |
| 2004/0077458 A1 | 4/2004 | Hartmann et al. |
| 2005/0000307 A1 | 1/2005 | Gumpoltsberger |
| 2005/0072255 A1 | 4/2005 | McCrary et al. |
| 2005/0204841 A1 | 9/2005 | Baldwin et al. |
| 2006/0016282 A1 | 1/2006 | Berger et al. |
| 2006/0047395 A1 | 3/2006 | Ikeya et al. |
| 2006/0163021 A1 | 7/2006 | Tsukada et al. |
| 2006/0207362 A1 | 9/2006 | Martin |
| 2006/0281563 A1 | 12/2006 | Martin |
| 2008/0194370 A1 | 8/2008 | Martin et al. |
| 2009/0227419 A1 * | 9/2009 | Martin et al. .................. 477/84 |
| 2009/0301241 A1 | 12/2009 | Martin |
| 2010/0257969 A1 * | 10/2010 | Martin et al. .................. 74/374 |

FOREIGN PATENT DOCUMENTS

| | | |
|---|---|---|
| DE | 871670 C | 3/1953 |
| DE | 1450177 | 4/1970 |
| DE | 2324801 | 5/1973 |
| DE | 2324881 | 5/1973 |
| DE | 19835334 | 8/1998 |
| DE | 19903115 | 8/2000 |
| DE | 19924501 | 12/2000 |
| DE | 19939334 | 3/2001 |
| DE | 10037401 | 2/2002 |
| DE | 10138358 | 2/2003 |
| DE | 10157943 | 6/2003 |
| DE | 10339427 | 3/2005 |
| DE | 10 2004007759 | 9/2005 |
| DE | 10 2005040400 | 5/2007 |
| DE | 10 2009 018795 A1 | 10/2010 |
| EP | 0 029711 A2 | 6/1981 |
| EP | 0584457 | 9/1995 |
| EP | 0677684 | 10/1995 |
| EP | 0797018 | 9/1997 |
| EP | 0809049 | 11/1997 |
| EP | 0849110 | 6/1998 |
| EP | 1072821 | 1/2001 |
| EP | 1344965 | 9/2003 |
| EP | 1439087 | 7/2004 |
| EP | 1 460305 A1 | 9/2004 |
| EP | 1452781 | 9/2004 |
| EP | 1471291 | 10/2004 |
| EP | 1519084 | 3/2005 |
| EP | 1564446 | 8/2005 |
| EP | 1584847 | 10/2005 |
| FR | 2025347 | 9/1970 |
| FR | 2312693 | 12/1976 |
| FR | 2583489 | 12/1986 |
| FR | 2810713 | 12/2001 |
| FR | 2853372 | 10/2004 |
| FR | 2 951 237 A1 | 4/2011 |
| GB | 1461094 | 1/1977 |
| GB | 2100812 A | 1/1983 |
| GB | 2159897 A | 12/1985 |
| GB | 2225819 | 6/1990 |
| GB | 2309754 | 8/1997 |
| GB | 2319817 | 6/1998 |
| GB | 2320531 | 6/1998 |
| JP | 63-088350 | 4/1988 |
| JP | 06-017890 | 1/1994 |
| WO | WO 96/28317 | 9/1996 |
| WO | WO 00/08360 | 2/2000 |
| WO | WO 01/29440 | 4/2001 |
| WO | WO 02/057108 | 7/2002 |
| WO | WO 03/078198 | 9/2003 |
| WO | WO 2004/005769 | 1/2004 |
| WO | WO 2004/099654 A1 | 11/2004 |
| WO | WO 2005/005868 A1 | 1/2005 |
| WO | WO 2005/005869 A1 | 1/2005 |
| WO | WO 2005/008092 | 1/2005 |
| WO | WO 2005/024261 A1 | 3/2005 |
| WO | WO 2005/026570 A1 | 3/2005 |
| WO | WO 2006/123128 | 11/2006 |
| WO | WO 2010/046655 A1 | 4/2010 |

OTHER PUBLICATIONS

International Search Report dated Feb. 6, 2007 for PCT Application No. PCT/GB2006/001853, filed May 18, 2006.

International Preliminary Report on Patentability and Written Opinion dated Nov. 19, 2007 for PCT Application No. PCT/GB2006/001853, filed May 18, 2006.

* cited by examiner

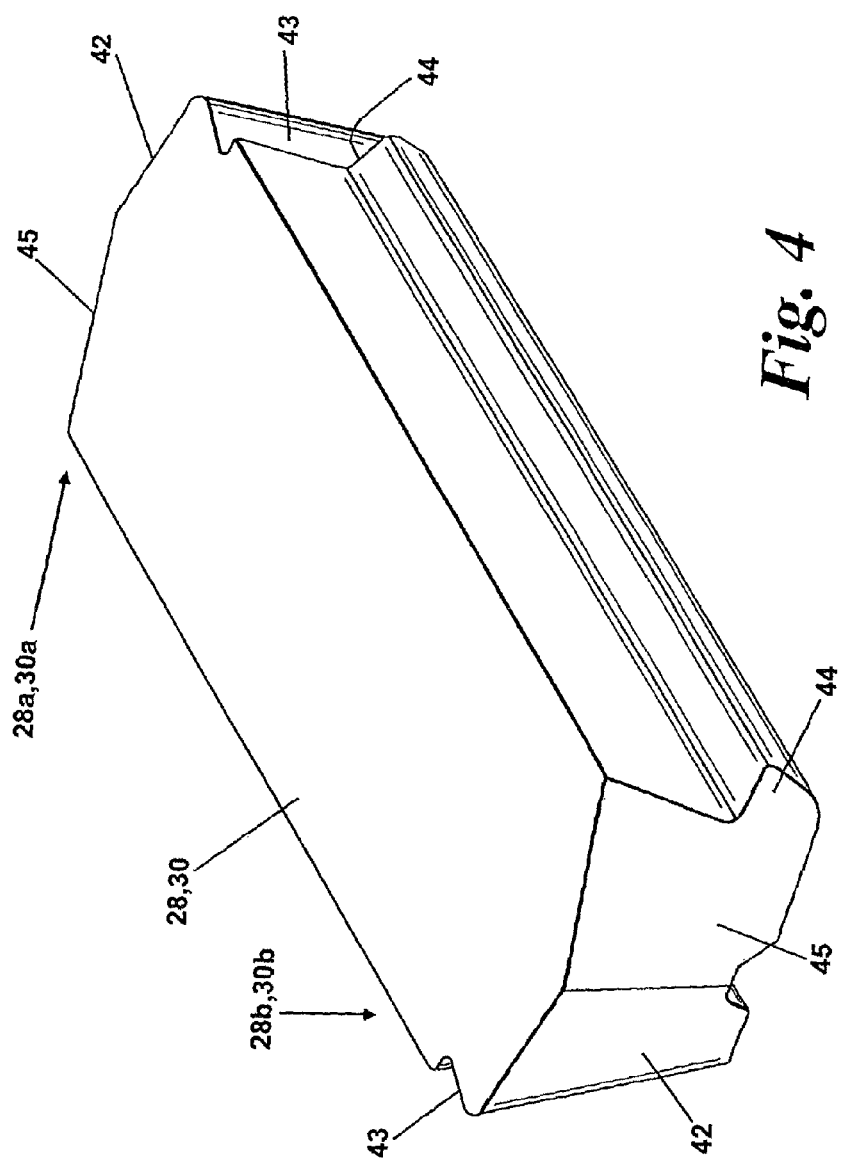

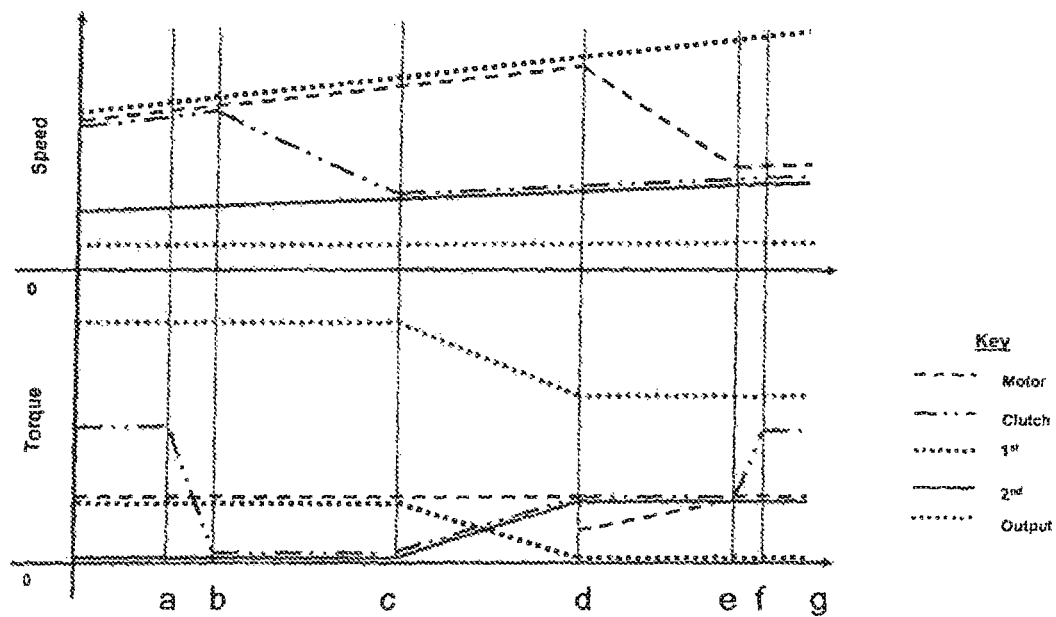
Fig 6
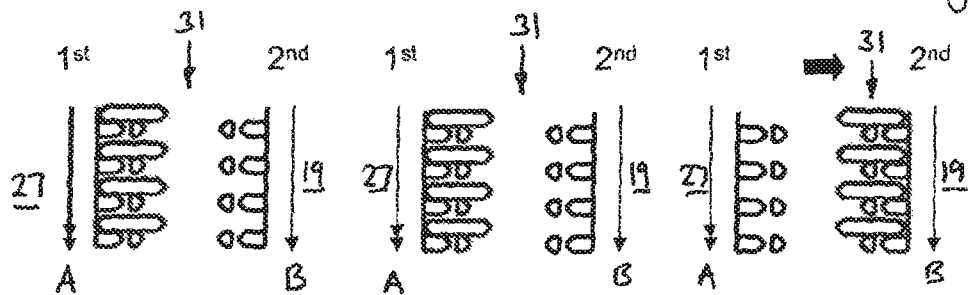
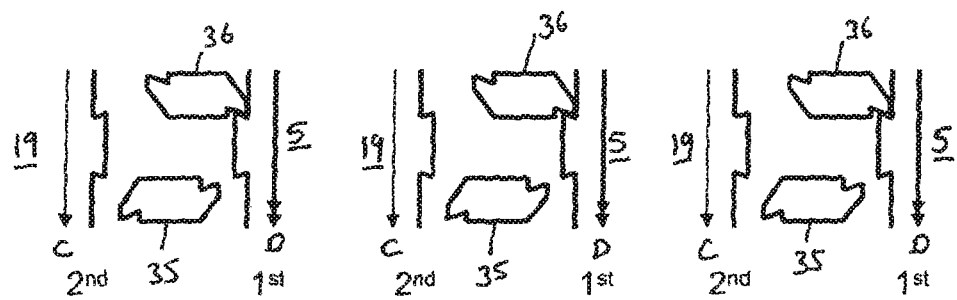
Shift request
Fig. 6A
Clutch open
Fig. 6B
Synch clutch
to 2nd gear
Fig. 6C

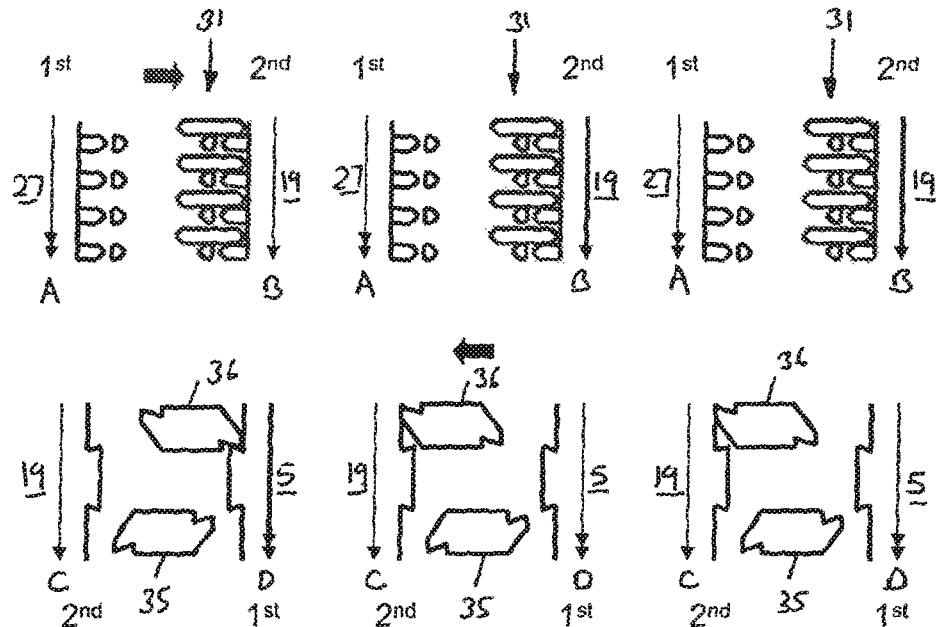
Fig. 6d Clutch to motor torque
Synch motor to 2nd gear
Fig. 6e
Close clutch
Fig. 6f
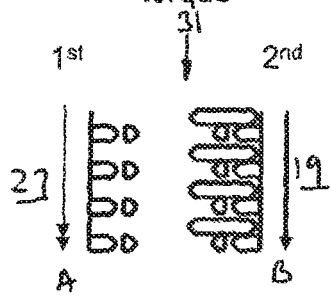
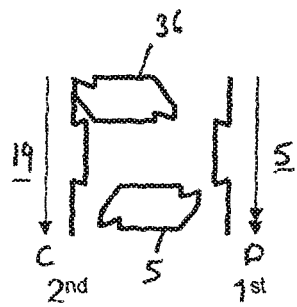
Shift complete
Fig. 6g

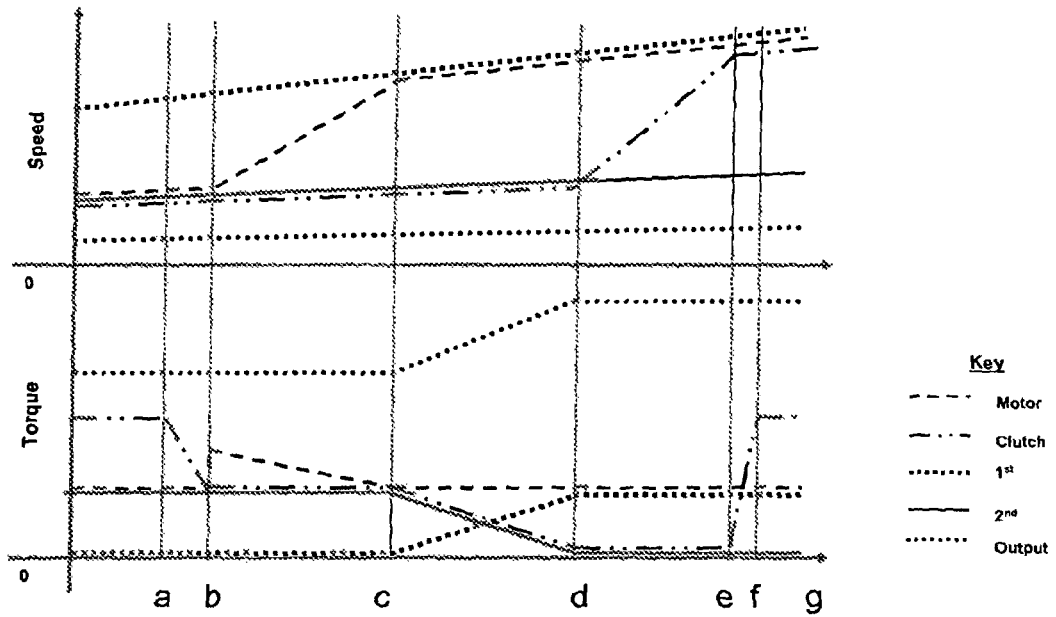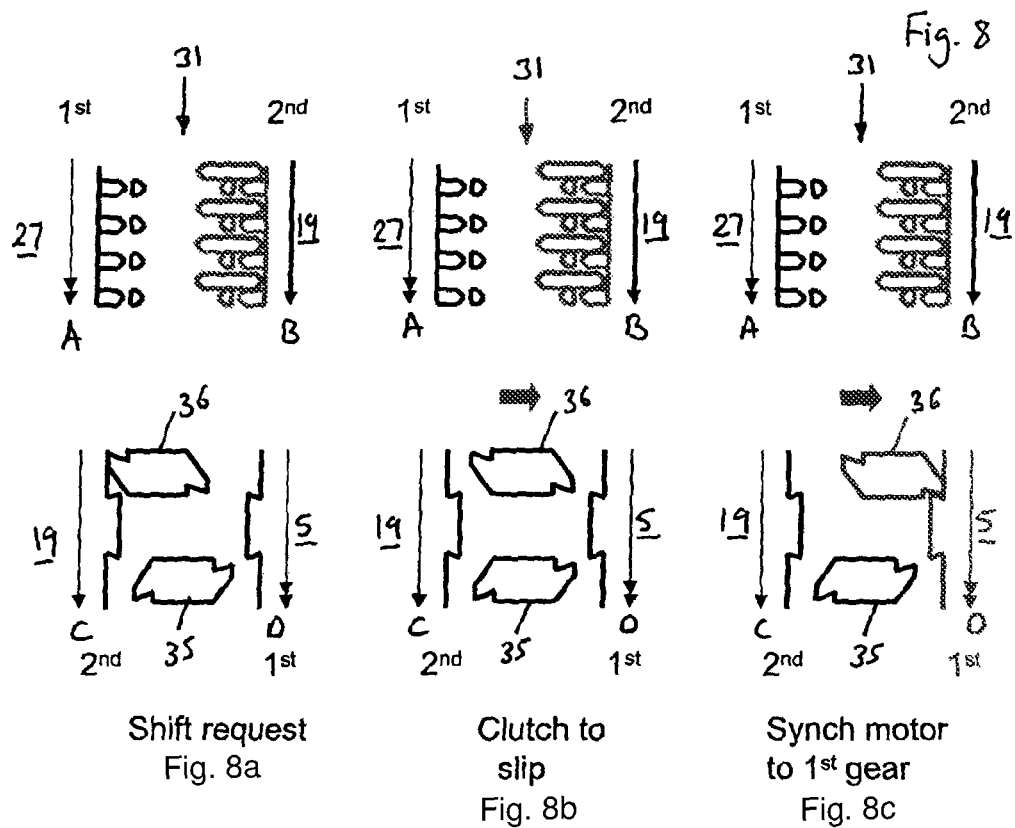
Fig. 8
| Shift request | Clutch to slip | Synch motor to 1st gear |
| Fig. 8a | Fig. 8b | Fig. 8c |

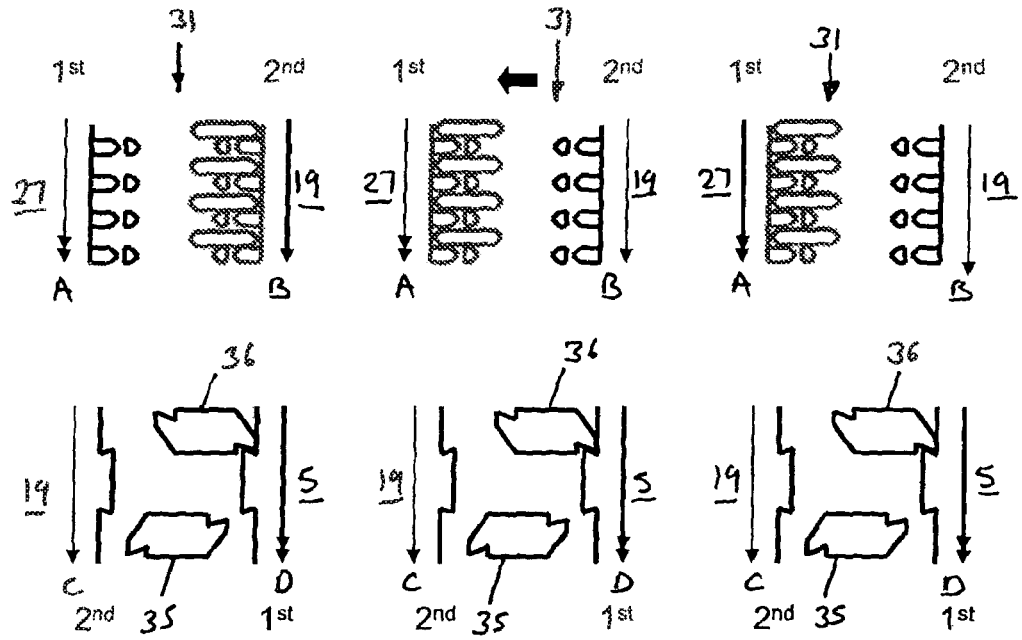
Fig. 8d Open clutch
Synch clutch to 1st gear
Fig. 8e
Close clutch
Fig. 8f
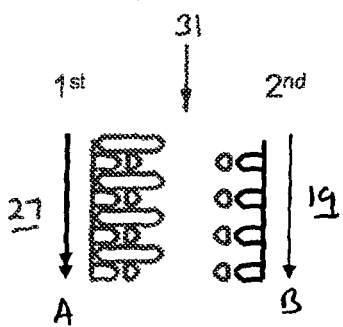
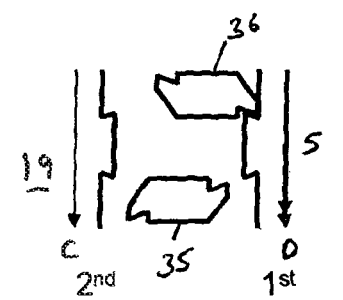
Shift complete
Fig. 8g

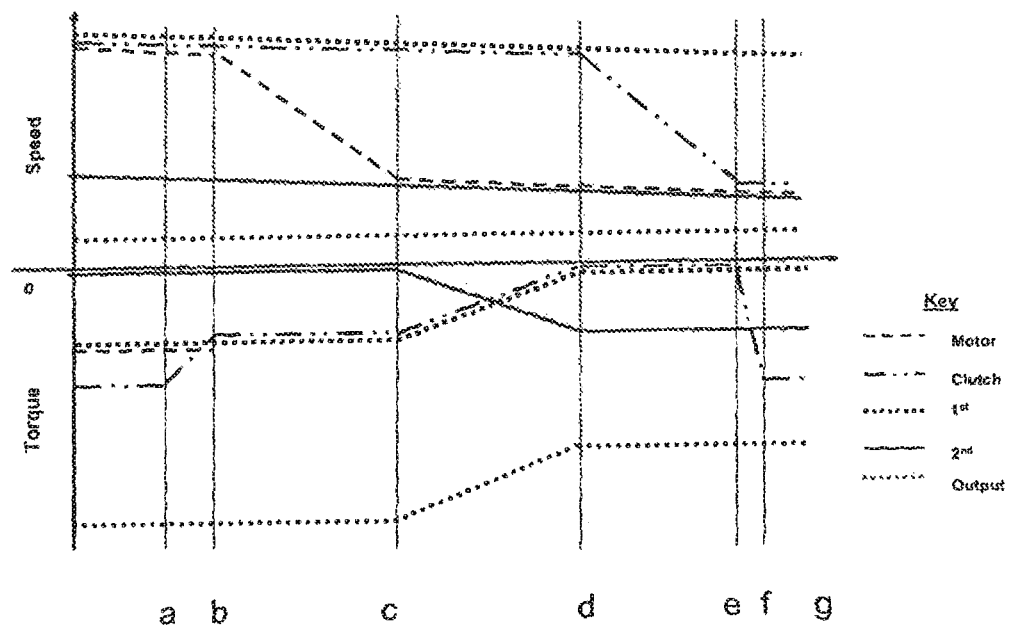
Fig. 10
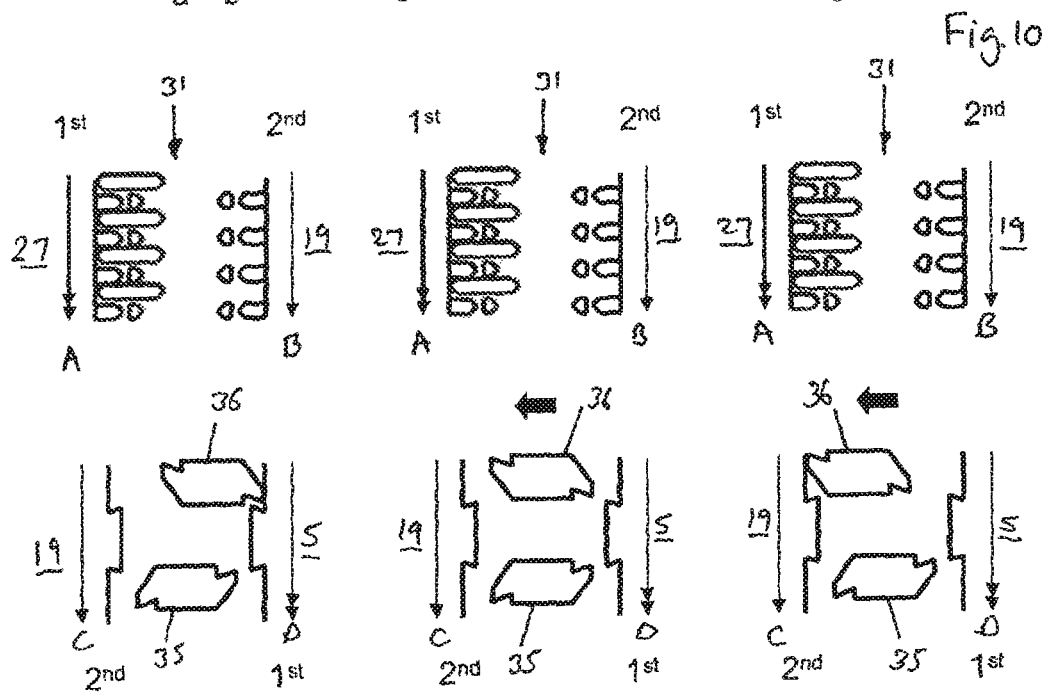
Shift request
Fig. 10a
Clutch to slip
Fig. 10b
Synch motor to 2nd gear
Fig. 10c

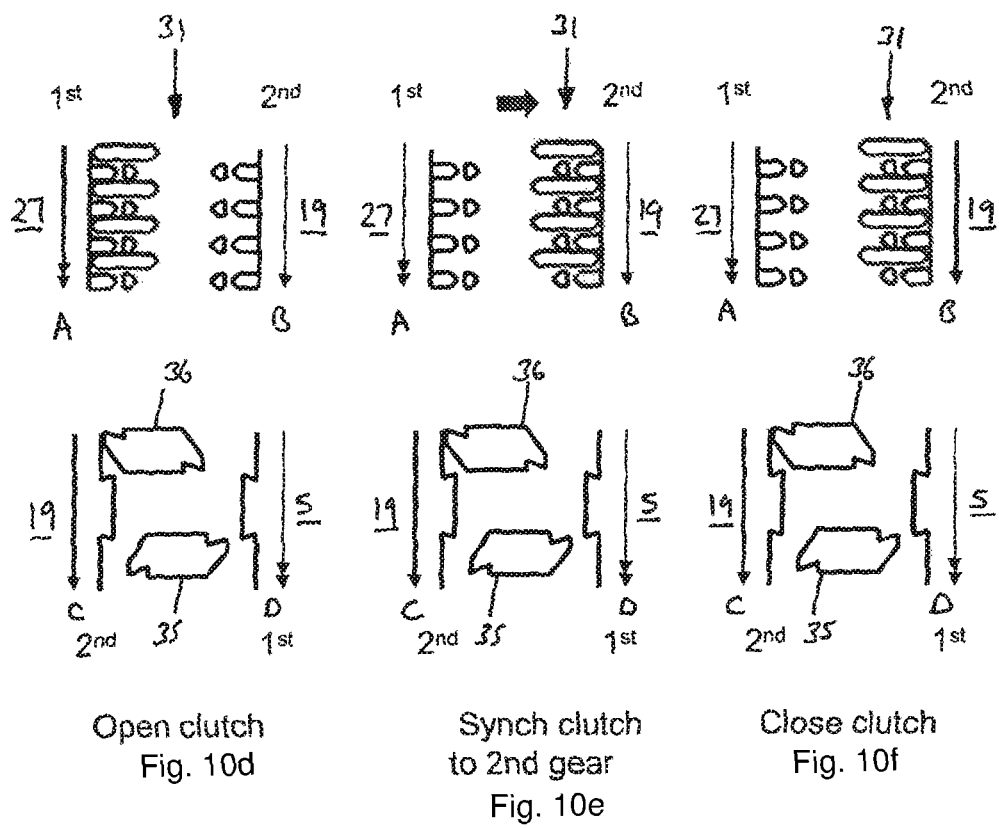
Open clutch
Fig. 10d
Synch clutch
to 2nd gear
Fig. 10e
Close clutch
Fig. 10f
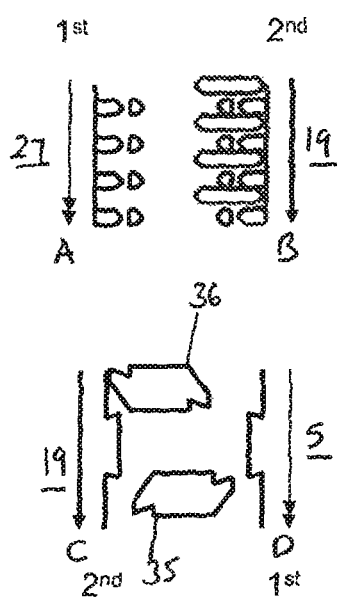
Shift complete
Fig. 10g

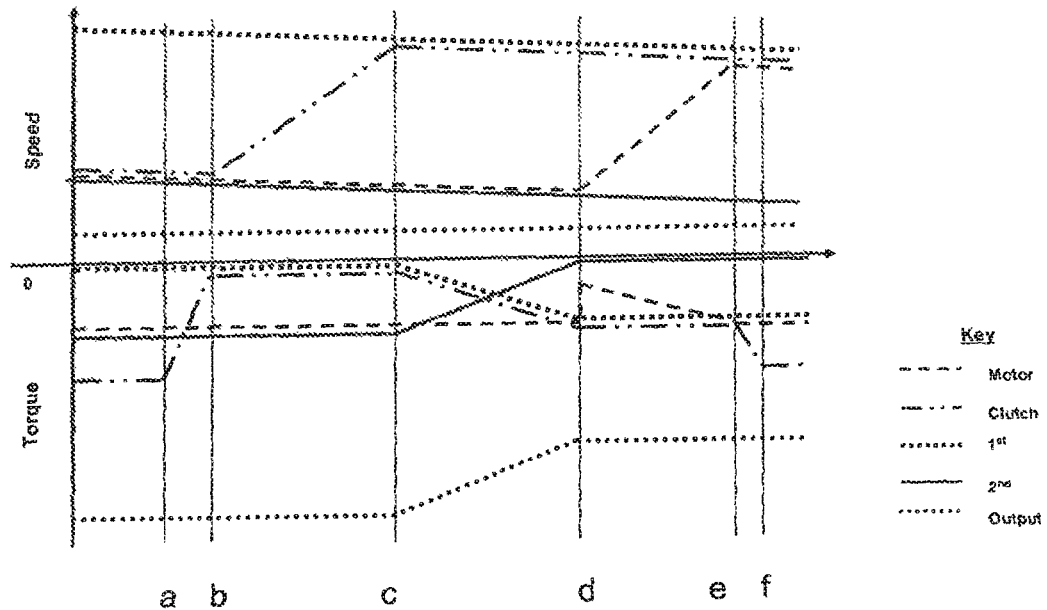
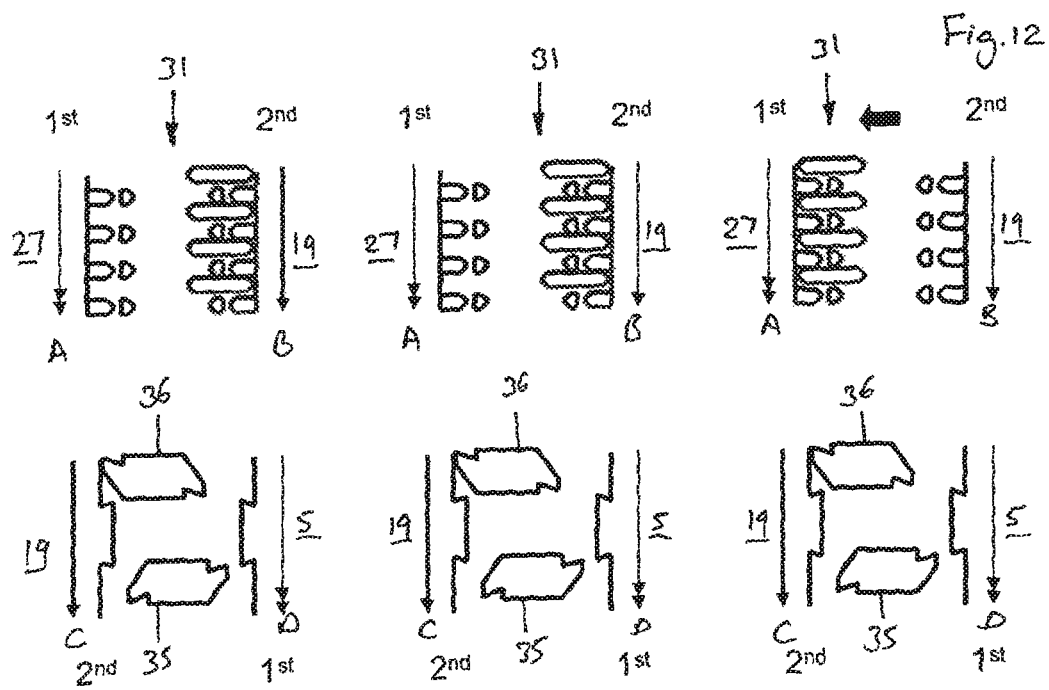
Shift request
Fig. 12a
Clutch open
Fig. 12b
Synch clutch
to 1st gear
Fig. 12c Clutch to motor torque Synch motor to 1st gear Close clutch

TRANSMISSION SYSTEM

CROSS-REFERENCE TO RELATED APPLICATIONS

This application is the U.S. National Phase application under 35 U.S.C. §371 of International Application PCT/GB2012/000465, filed May 25, 2012, which claims priority to Great Britain Application 1109100.6, filed May 27, 2011.

The present invention relates to transmission systems, in particular to dog-type transmission systems, gear elements and gear selector assemblies for transmission systems.

In conventional single clutch synchromesh transmission systems for vehicles it is necessary to disengage the transmission from the power source, such as an engine or motor, by operating the clutch before the current gear is deselected and the new gear is engaged. If the power is not disengaged when attempting to engage a new gear the synchromesh is unable to engage the new gear wheel or has to be forced into engagement with the risk of damaging the transmission and creating torque spikes in the transmission. This is because in most cases the speed of the engine is not matched to the speed of the new gear. For motor vehicles such as cars having conventional gearboxes and powered by an engine, the selection of a new gear ratio typically takes between 0.5 and 1 second to complete. So, for example, when a higher gear is selected the time delay allows the engine to reduce its speed [due to its own inertia] to more closely match the speed of the new gear before the clutch re-connects the engine and the transmission, thereby reducing the possibility of torque spikes occurring when the power is reapplied.

Dual Clutch Transmission (DCT) systems have tried to address this problem by using two clutches to handover the transfer of torque seamlessly when shifting between gears. However there are a number of drawbacks to DCTs, for example they require the use of two friction clutches which are heavy and expensive, they are complex to control and have parasitic losses and therefore are not very efficient.

Another type of seamless (sometimes referred to as instantaneous) transmission system is described in WO 2004/099654, WO 2005/005868, WO 2005/005869, WO 2005/024261 and WO 2005/026570, WO 2006/095140, WO 2006/123128, WO 2006/123166, WO 2007/132209, WO 2008/062192, WO 2008/096140, WO 2008/145979, WO 2009/068853, WO 2010/046654, WO 2010/046655, WO 2010/046652, the contents of which are incorporated by reference.

This family of transmission systems includes at least one selector assembly that is arranged to have four modes of operation with respect to the or each rotatably mounted gear wheel associated with it:

Fully engaged in both torque directions (fully in gear);
Disengaged in both torque directions (neutral);
Engaged in the forward torque direction while disengaged in the reverse torque direction;
Disengaged in the forward torque direction while engaged in the reverse torque direction.

It is the last two modes that enable a discrete ratio gearbox to have the ability to shift up or down ratios instantly under load without torque interruption. In some embodiments it is not necessary to have a neutral mode.

The selector assembly includes first and second sets of engagement members that are arranged to selectively engage drive formations on the or each gear wheel associated with it. The first and second set sets of engagement members are arranged such that a new gear can be selected while the current gear is still engaged and therefore the new gear can be selected under power for some shift types.

When designing a transmission system to include this type of selector assembly there are several significant issues that have to be considered: 1) engagement noise/torque spikes when a new gear is selected, 2) providing a shift strategy for power on down shifts (sometimes referred to as kick-down shifts), 3) size of the transmission and 4) transmission lockup.

Engagement noise/torque spikes can occur when a new gear is selected instantaneously because of the speed differential between the currently engaged gear and the new gear.

Power on down shifts pose difficulties because of the geometry of the selector assemblies.

With regard to size, there are usually packaging constraints that have to be taken into account, such as the size of the cavity provided in the vehicle for the transmission, whether it is front or rear wheel drive, the number of ratios to be accommodated, etc. There is a trend to provide a larger number of gear ratios, in cars it is not uncommon for transmissions to have 6-speeds, and it is envisaged that 7 and 8-speed transmissions will be used more frequently. While the number of ratios goes up, the space available for the transmission does not necessarily increase and therefore there is a strong desire to increase the number of ratios available without significantly increasing the transmission.

Transmission lockup is possible in transmission layouts that include more than one instantaneous selector assembly.

Some of the documents mentioned above provide technical solutions to each of these issues. For example, WO2005/005868 provides a control solution to engagement noise/torque spikes, whereas WO2008/062192 provides a damping solution. WO2004/099654 and WO2007/132209 provide non-instantaneous shift strategies to enable power on down shifts to be undertaken. In each case, a torque interrupt is required in order to release the set of engagement members that is drivingly engaged.

It with this background that the present invention seeks to provide an improved transmission system that mitigates at least one of the aforementioned problems, or at least provides an alternative transmission to existing systems.

According to one aspect of the invention there is provided a transmission system including a first input shaft that is arranged to receive drive directly from a drive source, and a second input shaft that is arranged to receive drive from the drive source via a drive interruption means, such as a friction clutch device, a first gear element rotatable relative to the first input shaft and a selector assembly for selectively locking the first gear element for rotation with the first input shaft from operational modes that include the following modes: lock the gear element for rotation with the first input shaft in forward and reverse torque directions, lock the gear element for rotation with the first input shaft in the forward torque direction and not lock in the reverse torque direction; and lock the gear element with rotation with the first input shaft in the reverse torque direction and not lock in the forward torque direction.

The inventors have discovered that providing transmission layouts with first and second input shafts with a selector assembly of the type claimed, can enable power on down shifts to take place substantially instantaneously. Also, a plurality of gears can be provided in a compact manner.

By directly connected it is meant that torque does not pass through the operable part of the friction clutch device, it may however have other intermediate components that provide a non-friction drive between the engine and the transmission, such as gears, clutch casing, etc. The first input shaft is directly connected in the sense that it provides an uninterruptible drive from the drive source to one of the selector assemblies of the transmission.

Advantageously the transmission system can include a second gear element rotatably mounted on the second input shaft and a second selector assembly for selectively locking the second gear element for rotation with the second input shaft.

Advantageously the second gear selector assembly is a non-instantaneous type, and is preferably a synchromesh or dog clutch type.

In one embodiment the transmission system can include a third gear element rotatably mounted on the first input shaft, wherein the first selector assembly is arranged to selectively lock the third gear element for rotation with the first input shaft from operational modes that include the following modes: lock the gear element for rotation with the first input shaft in forward and reverse torque directions, lock the gear element for rotation with the first input shaft in the forward torque direction and not lock in the reverse torque direction; and lock the gear element with rotation with the first input shaft in the reverse torque direction and not lock in the forward torque direction, and the second selector assembly is arranged to selectively lock the third gear element for rotation with second shaft.

The transmission system can include a fourth gear element rotatably mounted on the second input shaft, wherein the second gear selector assembly is arranged to selectively lock the first gear element for rotation with the second input shaft.

The transmission system can include a torque transfer pathway between the first gear element and the second input shaft. This enables torque support to be provided to first gear during a shift from the second input shaft. The torque transfer pathway can include a fifth gear element fixed for rotation with the layshaft and in meshing engagement with the fourth gear element, and a fifth gear element fixed for rotation with the lay shaft and in meshing engagement with the first gear element. Advantageously the gear ratio of the transfer gear train is the inverse of the gear ratio between the meshing gears mounted on the first and second layshafts. For example, if the ratio of the transfer gear train is 2:1 then the ratio between the meshing first and second layshaft gears is 1:2.

The transmission system can include an output shaft having seventh and eighth gear elements fixed for rotation therewith, said seventh gear element being in meshing engagement with the first gear element and said eighth gear element being in meshing engagement with the third gear element. The first gear element and the seventh gear element provide first gear. The third gear element provide second gear. The transmission system is preferably arranged as a two speed transmission system, for example for use with combustion engines, and particularly electric vehicles.

In another embodiment the transmission system can include a third gear element rotatably mounted on the first input shaft, wherein the first gear selector device is arranged to locking the first gear element for rotation with the first input shaft from operational modes that include the following modes: lock the gear element for rotation with the first input shaft in forward and reverse torque directions, lock the gear element for rotation with the first input shaft in the forward torque direction and not lock in the reverse torque direction; and lock the gear element with rotation with the first input shaft in the reverse torque direction and not lock in the forward torque direction.

A fourth gear element is rotatably mounted on the second input shaft, wherein the second selector assembly is arranged to selectively lock the fourth gear element for rotation with the second input shaft.

Advantageously the first and second gear elements are in meshing engagement.

Advantageously the third and fourth gear elements are in meshing engagement.

Advantageously a fifth gear element is mounted on a lay shaft, said fifth gear element being in meshing engagement with the second gear element. Advantageously the fifth gear element is fixed for rotation with the lay shaft.

Advantageously a sixth gear element is mounted on a lay shaft, the sixth gear element being in meshing engagement with the fourth gear element. The sixth gear element is rotatably mounted on the lay shaft via a gear support member, which is preferably a sleeve member.

The transmission system can include at least one gear train for transferring torque from the gear support member to an output shaft, said gear train including a seventh gear element mounted on the gear support member an eighth gear element mounted on the output shaft. The seventh and eighth gear elements are in meshing engagement. The seventh gear element can be arranged to rotate with the gear support member or can be rotatably mounted thereon. The eighth gear element can be arranged to rotate with the output shaft or can be rotatably mounted thereon. Typically, if the seventh gear element is rotatably mounted, the eighth gear element is arranged to rotate with the output shaft, and vice versa. Advantageously the transmission system can include a plurality of gear trains for transferring torque between the gear support member and the output shaft. Advantageously each gear train provides an even gear, for example $2^{nd}$, $4^{th}$ or $6^{th}$ gear.

The transmission system can include at least one gear train for transferring torque from the lay shaft to an output shaft, said gear train including a ninth gear element mounted on the lay shaft and a tenth gear element mounted on the output shaft. The ninth and tenth gear elements are in meshing engagement. The ninth gear element can be arranged to rotate with the lay shaft or can be rotatably mounted thereon. The tenth gear element can be arranged to rotate with the output shaft or can be rotatably mounted thereon. Typically, if the eighth gear element is rotatably mounted, the tenth gear element is arranged to rotate with the output shaft, and vice versa. Advantageously the transmission system can include a plurality of gear trains for transferring torque between the lay shaft and the output shaft. Advantageously each gear train provides an odd gear, for example $1^{st}$, $3^{rd}$, 5th gear. Thus the odd and even gears are split into two groups. Preferably the transmission system is arranged as a sequential transmission so that shifts move alternately between odd and even gears. Many different configurations of the gear trains are possible.

The transmission system can include at least one pre-select gear selector assembly that is arranged to preselect a gear prior to a shift taking place, said shift being implemented by operation of the first and/or second gear selector assemblies. The pre-select gear selector assembly can include a gear element that is mounted on any one of the gear support member, the lay shaft and the output shaft and is arranged such that the gear element rotates with the shaft/member and is arranged to slide axially along the shaft/member so that it can be moved into and out of engagement an adjacent gear element to selectively lock the adjacent gear element with the shaft/member.

Advantageously the first input shaft can include first and second parts connected together via a gear train, wherein the first part is tubular and is arranged to house at least part of the first input shaft, the arrangement being such that the first part is substantially coaxially with the first input shaft.

Advantageously one of the first and second input shafts is tubular and houses at least part of the other of the first and second input shafts, the arrangement being such that at least part of the shafts are substantially co-axial. This provides a very compact arrangement.

In another embodiment the transmission system can include a second gear element fixed for rotation with the second input shaft, a third gear element mounted on an output shaft, said third gear element being in meshing engagement with the second gear element. The second and third gear elements provide $2^{nd}$ gear. Advantageously the third gear element is fixed for rotation with the output shaft.

A fourth gear element mounted on the output shaft, said fourth gear element being in meshing engagement with the first gear element. The first and fourth gear elements provide $1^{st}$ gear. Advantageously the fourth gear element is fixed for rotation with the output shaft. Advantageously the transmission is best suited to a two speed electric vehicle. For example, there can be provided a drive train including an electric motor drive source, a friction clutch device and a 2-speed transmission system as described herein.

Advantageously the first selector mechanism includes first and second sets of engagement members, wherein each engagement member includes an engagement face at one end only. This is because for this layout the selector assembly only engages one gear element. Thus a reduced with selector can be provided, which reduces the size of the selector assembly and hence the gap between the first and second gear elements.

Advantageously the transmission according to any configuration described herein can include a control system for controlling operation of the transmission system. In one embodiment the control system is programmed to prevent power off type shifts occurring. This enables a very simple two speed transmission to be provided that is highly compact.

Advantageously the first selector assembly includes first and second sets of engagement members.

The first and second sets of engagement members can move independently of each other. The engagement members in the first set can each include a driving face and a slipping face at a first engagement side and a driving face and a slipping face at the other engagement side. Typically the first and second engagement sides are opposite handed. Each engagement member in the second set can include a driving face and a slipping face at a first engagement side and a driving face and a slipping face at the other engagement side. Typically the first and second engagement sides are opposite handed.

Advantageously the first and second sets of engagement members are mounted together such that at each engagement side, the engagement faces of the first set of engagement members are opposite handed to the engagement faces of the second set of engagement members.

Advantageously the first selector assembly can be arranged to select the following operational mode with respect to the or each associate gear element: not locked in a clockwise or anti-clockwise directions (neutral).

The first selector mechanism is arranged to slip relative to its associated gear/shaft under certain operational conditions.

Advantageously the first selector assembly can include an actuator system. When the first selector assembly includes the first and second sets of engagement members they can be arranged such that when a driving force is transmitted, one of the first and second sets of engagement members drivingly engages the engaged gear, and the other set of engagement members is then in an unloaded condition, the actuator system is arranged to move the unloaded set of engagement members in response to a request to shift gear. This arrangement can be with respect to one or both of the selector assembly's associated gear elements.

The actuator assembly can be arranged to move the unloaded set into driving engagement with the unengaged gear element during the gear when performing instantaneous gearshifts while the loaded set of remains engaged with the current gear element.

Advantageously the first selector assembly can be arranged such that when a braking force is transmitted the first set of engagement members drivingly engages the engaged gear element, and the second set of engagement members is in an unloaded condition, and when a driving force is transmitted the second set of engagement members drivingly engages the engaged gear element, and the first set of engagement members is then in an unloaded condition. Each of the first and second selector assemblies can be arranged in this manner with respect to one or both of its associated gear elements.

The actuator system can include a first actuator device for actuating the first set of engagement members and a second actuator device for actuating the second set of engagement members independently of the first actuator device. The actuator system for the first selector assembly can include a first actuator device for actuating the first set of engagement members and a second actuator device for actuating the second set of engagement members independently of the first actuator device. Preferably the actuator system includes a first actuator member for moving the first set of engagement members and a second actuator member for moving the second set of engagement members, which can be actuated by the first and second actuator devices respectively. Alternatively the first and second sets of engagement members can be actuated by a single actuator. The actuator assembly can include at least one resilient means arranged to move at least one of the first and second sets of engagement members into engagement with the first and second gear elements when the engagement members are in unloaded conditions. Preferably the or each resilient means is arranged to bias at least one of the first and second sets of engagement members towards the first or second gear element when the engagement members are drivingly engaged with a gear element.

The control system can be arranged to control each step automatically performed in a gear shift. The control system can include a drive source control unit and a transmission control unit. The control system can receive inputs from vehicle sensors such as a drive source speed sensor, vehicle speed sensor, transmission sensors for sensing speed and positions of selector assemblies, and other sensors.

In response to a request for a new gear, the control system can be arranged to actuate the actuator assembly to move the unloaded set of engagement elements of the one of the first and second selector assemblies that is transmitting drive between its associated lay shaft and the first drive source to a neutral position prior to switching drive from the first drive source to the other lay shaft by operation of the other of the first and second selector assemblies.

Advantageously the transmission system can be arranged such that when driving in first gear, torque is provided from the drive source to the first gear train via both the direct and friction torque input paths.

Advantageously the transmission system can be arranged such that when in overrun in 1st gear, torque is routed from an output shaft to the second input shaft via the first gear train.

Advantageously the transmission system can be arranged such that when driving in 2nd gear torque is routed from the second input shaft to the output shaft via $2^{nd}$ gear.

Advantageously the transmission system can be arranged such that when in overrun in $2^{nd}$ gear torque is routed from the output shaft to first and second input shafts via the $2^{nd}$ gear.

In preferred embodiments, when performing power on up shifts, torque is switched from the direct input torque path (first input shaft) to the friction torque input path (second input shaft). For power off up shifts, torque is switched from the friction torque input path (second input shaft) to the direct torque input path (first input shaft). For power off downshifts, torque is switched from the direct torque input path (first input shaft) to the friction torque input path (second input shaft). For power on downshifts, torque is switched from the friction input torque path (second input shaft) to the direct torque input path (first input shaft).

Advantageously the transmission system can be arranged to undertake the following power on up shift method: starting from a condition where positive torque is applied to the $1^{st}$ gear from both the first and second input shafts, in response to the up shift request, opening the clutch device; and synchronising the speed of the friction clutch device to the speed of $2^{nd}$ gear. The transmission system can be arranged to match the clutch torque to the drive source torque, for example by increasing the clutch torque capacity. The transmission system can be arranged to synchronise the drive source speed to the speed of $2^{nd}$ gear. The transmission system can be arranged to close the friction clutch device to complete the shift.

Advantageously the transmission system can be arranged to undertake the following power off up shift method: starting from a condition wherein gear is in an overrun condition and torque is routed from the output shaft to the friction torque input path (second input shaft) via $1^{st}$ gear, in response to the up shift request, setting the friction clutch device to a slip condition by reducing the clutch torque capacity; and synchronising the speed of the drive source to the speed of $2^{nd}$ gear. The transmission system can be arranged to open the friction clutch device. The transmission system can be arranged to synchronise the transmission side of the friction clutch device to $2^{nd}$ gear. The transmission system can be arranged to close the friction clutch device to complete the shift.

Advantageously the transmission system can be arranged to undertake the following power on down shift method: starting from a condition wherein positive torque is applied to $2^{nd}$ gear from the friction torque input path, in response to the down shift request, setting the friction clutch device to a slip condition by reducing clutch torque capacity; and synchronising the speed of the drive source to the $1^{st}$ gear. The transmission system can be arranged to open the friction clutch device. The transmission system can be arranged to synchronise the speed of the transmission side of the friction clutch device with the speed of the 1st gear. The transmission system can be arranged to close the friction clutch device to complete the shift.

Advantageously the transmission system can be arranged to undertake the following power off down shift method: starting from a condition wherein positive torque is applied to 1st gear from both the direct and friction torque input paths (first and second input shafts), in response to the down shift request, opening the friction clutch device; and synchronising the speed of the transmission side of the friction clutch device to the speed of 1st gear. The transmission system can be arranged to match the friction clutch device torque to the drive source torque. The transmission system can be arranged to synchronise the drive source speed to the speed of the first gear train. The transmission system can be arranged to close the friction clutch device to complete the shift.

Advantageously the transmission system can be arranged to undertake the following power on up shift method: starting from a condition where positive torque is applied to the $1^{st}$ gear from the first input shaft, in response to the up shift request, an unloaded set of engagement members is disengaged from the first gear element, increasing the clutch torque capacity until it is substantially at a maximum; removing the formerly loaded set of engagement members from the first gear element; and synchronising the speed of the drive source to the speed of $2^{nd}$ gear. The transmission system can be arranged to close the friction clutch device to complete the shift.

Advantageously the transmission system can be arranged to undertake the following power on down shift method: starting from a condition wherein positive torque is applied to $2^{nd}$ gear from the friction clutch via the second input shaft, in response to the down shift request, adjusting the clutch torque capacity to set the friction clutch device to a slip condition by; and synchronising the speed of the drive source to the $1^{st}$ gear speed. The transmission system can be arranged to reduce the clutch torque capacity until substantially zero torque is transmitted. Torque handover occurs.

Advantageously each of the functions mentioned in the shift sequences are controlled by the control system.

According to another aspect of the invention there is provided a drive train including a drive source, a friction clutch device, such as a wet friction clutch or a dry friction clutch, and a transmission system according to any configuration described herein. Advantageously the second input shaft is connected to the drive train via the friction clutch device, such as a friction clutch. The clutch device enables drive from the drive source to be interrupted. The first input shaft is connected to the drive source such that it is uninterruptible, that is, it is not connected to the drive source via a clutch device or similar decoupling device.

According to another aspect of the invention there is provided a vehicle such as a car, lorry, motor cycle, tractor, etc, including a transmission system or drive line according to any aspect of the invention described herein.

According to another aspect of the invention there is provided a method for performing a power on down shift: including providing a transmission system including a first input shaft that is arranged to receive drive directly from a drive source, and a second input shaft that is arranged to receive drive from the drive source via a drive interruption means, such as a friction clutch device, first and second gear trains, a first gear element rotatable relative to the first input shaft, and a selector assembly for selectively locking the first gear element for rotation with the first input shaft from operational modes that include the following modes: lock the gear element for rotation with the first input shaft in forward and reverse torque directions, lock the gear element for rotation with the first input shaft in the forward torque direction and not lock in the reverse torque direction; and lock the gear element with rotation with the first input shaft in the reverse torque direction and not lock in the forward torque direction, said method further including adjusting torque clutch capacity of a friction clutch device to set the clutch device to a slip condition; synchronising a drive source speed with the first gear train; reducing clutch torque capacity until substantially no torque is transmitted; and synchronising the speed of a transmission side of the friction clutch device with the first gear train. This is an instantaneous power on downshift.

The method can include closing the friction clutch device.

The method can include selecting the first gear element and locking it for rotation with the first input shaft.

Advantageously the transmission system can be arranged such that the first gear train includes the first gear element.

The method can include providing a second gear element rotatably mounted on the second input shaft and a second selector assembly for selectively locking the second gear element for rotation with the second input shaft, a third gear element rotatably mounted on the first input shaft, wherein the first selector assembly is arranged to selectively lock the third gear element for rotation with the first input shaft from operational modes that include the following modes: lock the gear element for rotation with the first input shaft in forward and reverse torque directions, lock the gear element for rotation with the first input shaft in the forward torque direction and not lock in the reverse torque direction; and lock the gear element with rotation with the first input shaft in the reverse torque direction and not lock in the forward torque direction, and the second selector assembly is arranged to selectively lock the third gear element for rotation with second shaft.

The second gear train can include the third gear element.

The method can include the first selector assembly disengaging the third gear element when a shift request is made.

The method can include the first selector assembly engaging the first gear element during or after the step of synchronising the drive source speed with the first gear train.

The method can include the second selector assembly initially engaging the third gear element when the shift request is made and disengages the third gear element when synchronising the clutch speed to the speed of the first gear train.

The second selector mechanism selects a fourth gear element rotatably mounted on the second input shaft.

According to another aspect of the invention there is provided a method for performing a power on down shift: including providing transmission system including a first input shaft that is arranged to receive drive directly from a drive source, and a second input shaft that is arranged to receive drive from the drive source via a drive interruption means, such as a friction clutch device, a first gear train including a first gear element rotatable relative to the first input shaft, and a second gear train, and a selector assembly for selectively locking the first gear element for rotation with the first input shaft from operational modes that include the following modes: lock the gear element for rotation with the first input shaft in forward and reverse torque directions, lock the gear element for rotation with the first input shaft in the forward torque direction and not lock in the reverse torque direction; and lock the gear element with rotation with the first input shaft in the reverse torque direction and not lock in the forward torque direction, including adjusting torque capacity of the friction clutch to set the clutch to a slip condition; synchronising the drive source speed to the first gear element; selecting the first gear element with the selector assembly; and reducing torque capacity of the friction clutch until there is substantially no torque transmitted thereby handing over torque from the first gear train to the second gear train. This is an instantaneous power on downshift.

According to another aspect of the invention there is provided a transmission system including a first input shaft that is arranged to receive drive directly from a drive source, and a second input shaft that is arranged to receive drive from the drive source via a drive interruption means, such as a friction clutch device, a first gear element rotatable relative to the first input shaft and a selector assembly for selectively locking the first gear element for rotation with the first input shaft, wherein the first selector assembly includes first and second sets of engagement elements that are moveable independently of each other and can each set can be moved into and out of engagement with the first gear element, set sets of engagement members being arranged such that when a braking force is transmitted the first set of engagement members drivingly engages the first gear element, and the second set of engagement members is in an unloaded condition, and when a driving force is transmitted the second set of engagement members drivingly engages the first gear element, and the first set of engagement members is then in an unloaded condition. This aspect of the invention can be arranged in accordance with any configuration described herein.

According to another aspect of the invention there is provided a transmission system including a first input shaft that is arranged to receive drive directly from a drive source, and a second input shaft that is arranged to receive drive from the drive source via a drive interruption means, such as a friction clutch device, a first gear element rotatable relative to the first input shaft and a selector assembly for selectively locking the first gear element for rotation with the first input shaft, wherein the first selector assembly includes first and second sets of engagement elements that are moveable independently of each other and can each set can be moved into and out of engagement with the first gear element, set sets of engagement members being arranged such that when a braking force is transmitted the first set of engagement members drivingly engages the first gear element, and the second set of engagement members is in an unloaded condition, and when a driving force is transmitted the second set of engagement members drivingly engages the first gear element, and the first set of engagement members is then in an unloaded condition. This aspect of the invention can be arranged in accordance with any configuration described herein.

The invention has many advantages, which include:

The transmission system is significantly less complex and easier to control than a DCT type transmission system.

The capacity of the synchronisers is small because the layout of the transmission means that the size of the inertia that has to be synchronised is relatively small. In DCTs the capacity of the synchronisers is significantly higher.

Only one type of synchroniser is required, which reduces manufacturing costs. For DCTs it is often required to have many different types of synchronisers in different parts of the transmission.

The transmission layout and shift strategies employed enables instantaneous power on down shifts.

Since there is only one instantaneous type selector mechanism in the transmission, the lockup problem does not occur because shifts using a single type of instantaneous selector mechanism are inherently safe.

The transmission layout is very compact. It is also versatile in the sense that it can be used front wheel drive vehicles, rear wheel drive vehicles and all wheel drive vehicles.

The layout uses many regular transmission components so existing production lines can easily be adapted to manufacture this transmission layout.

The transmission is scalable, that is it can be used with any practicable number of gears, including all common requirements such as 2, 3, 4, 5, 6, 7, 8, 9, 10 and multiple gears for larger vehicles such, as lorries.

The layout and shift strategies enables the torque in the transmission to be controlled during a gearshift in a manner that eliminates engagement torque spikes so it is not necessary for any of the gears to include dampers.

Embodiments of the present invention will now be described, by way of example only, with reference to the accompanying drawings in which like references indicate equivalent features, wherein:

FIG. 1*a* is a schematic view of a first embodiment to the invention: 2 speed transmission system for use with a combustion engine or an electric motor drive;

FIG. 1*b* is an enlarged schematic view of part of the transmission of FIG. 1*a*;

FIG. 4 is an isometric view of an engagement element from the selector mechanism;

Figure 5A:
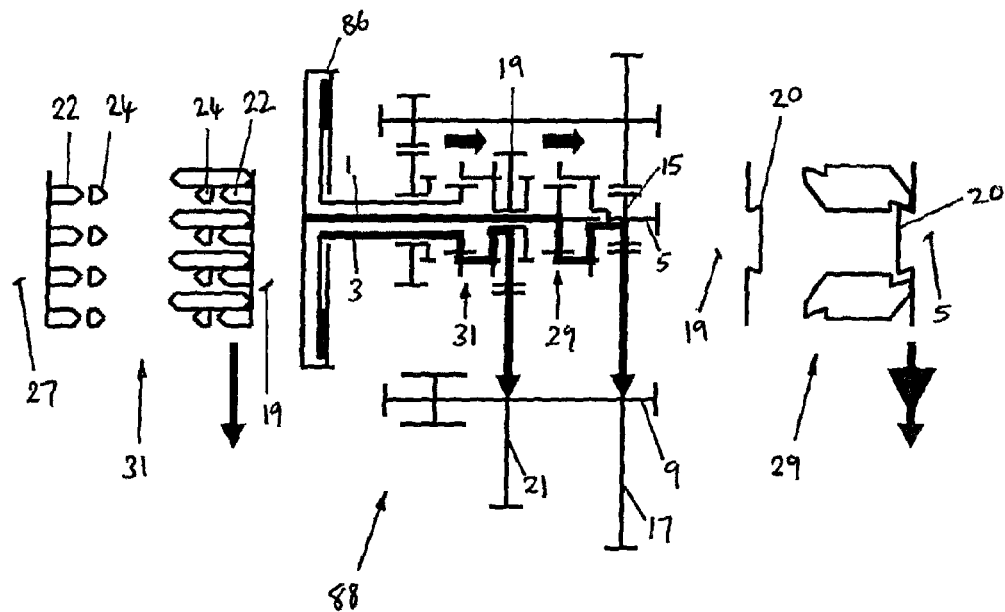
Figure 5B:
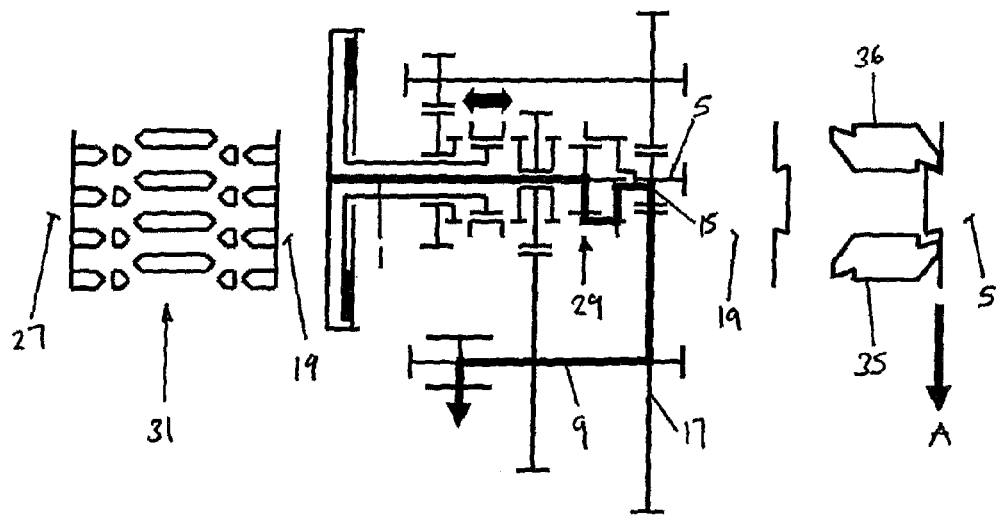
Figure 5C:
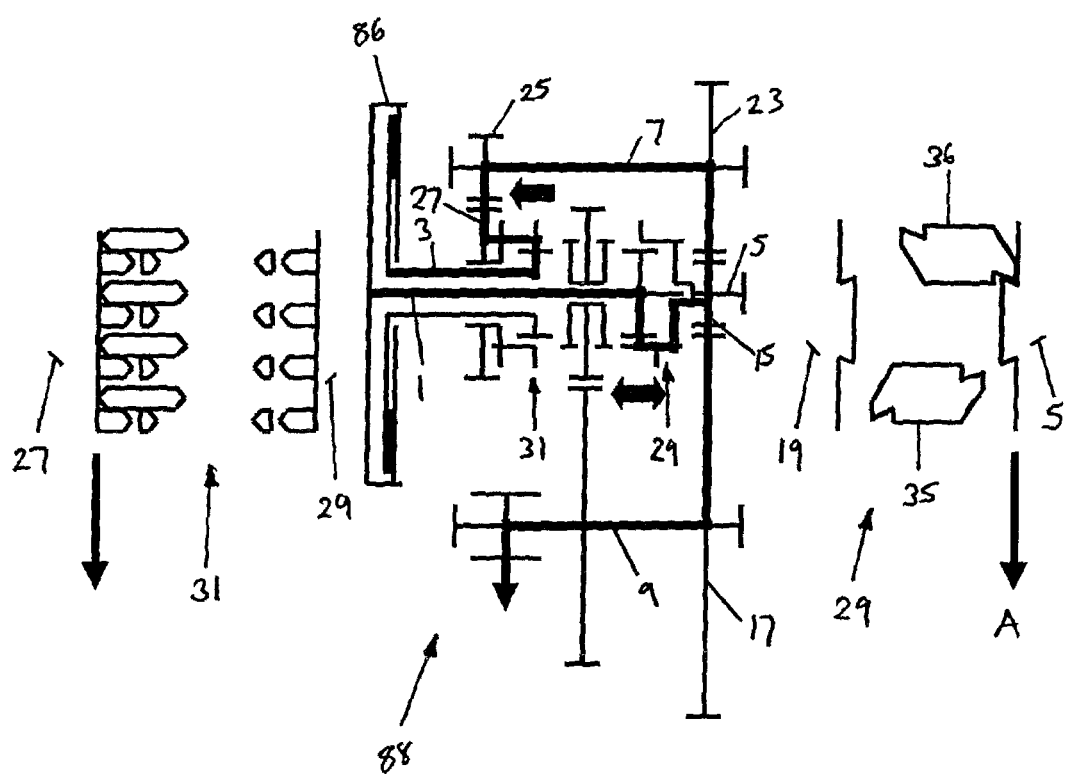
Figure 7:
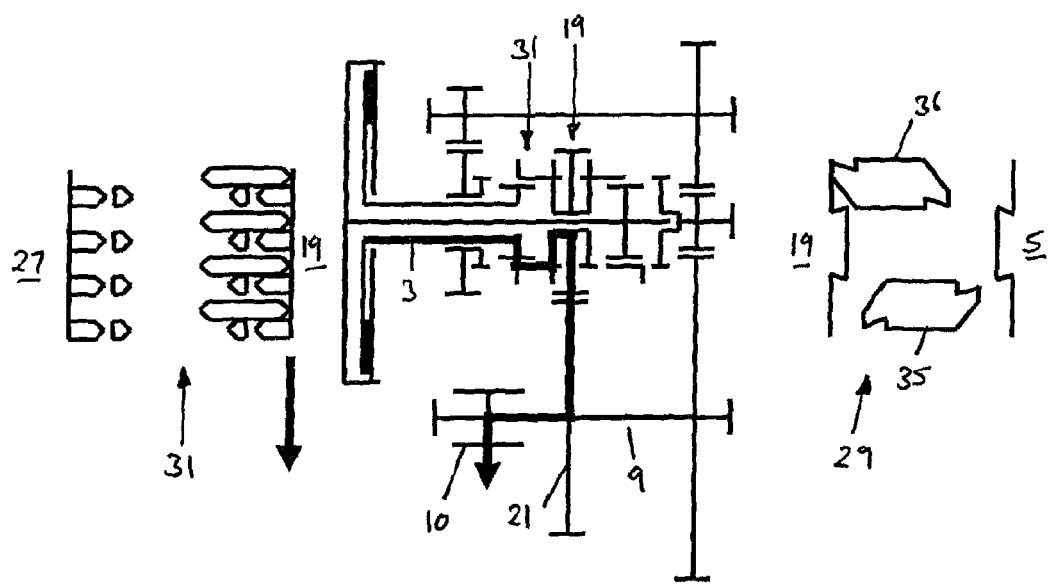
Figure 9:
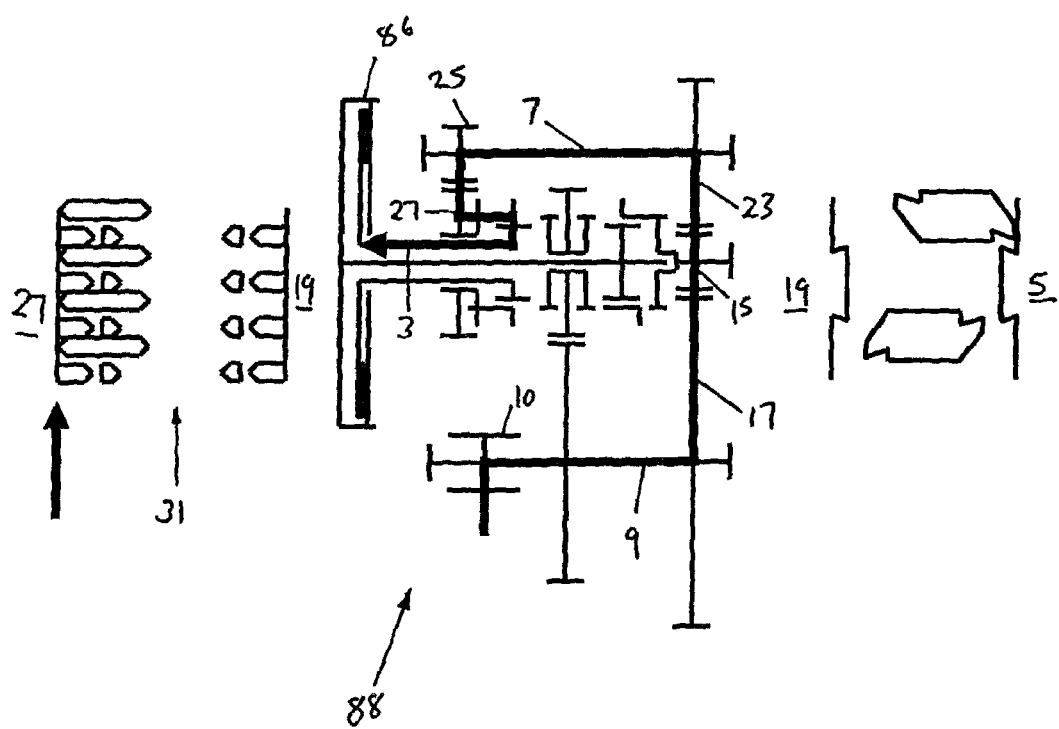
Figure 11:
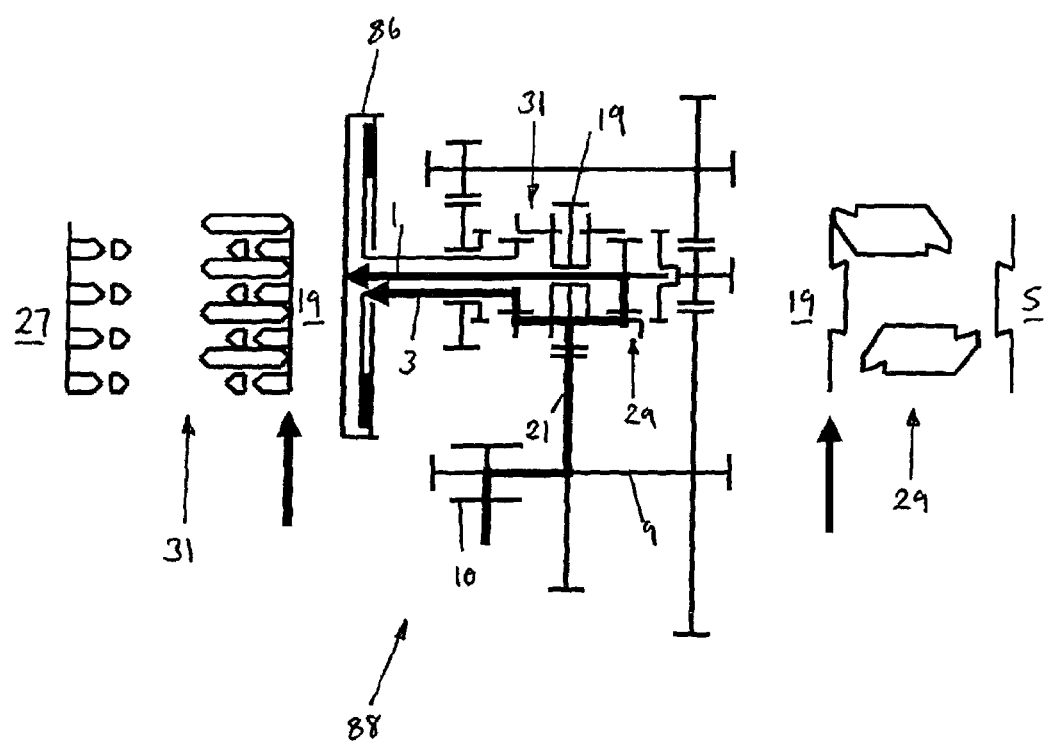
Figures 12D, 12E, 12F:
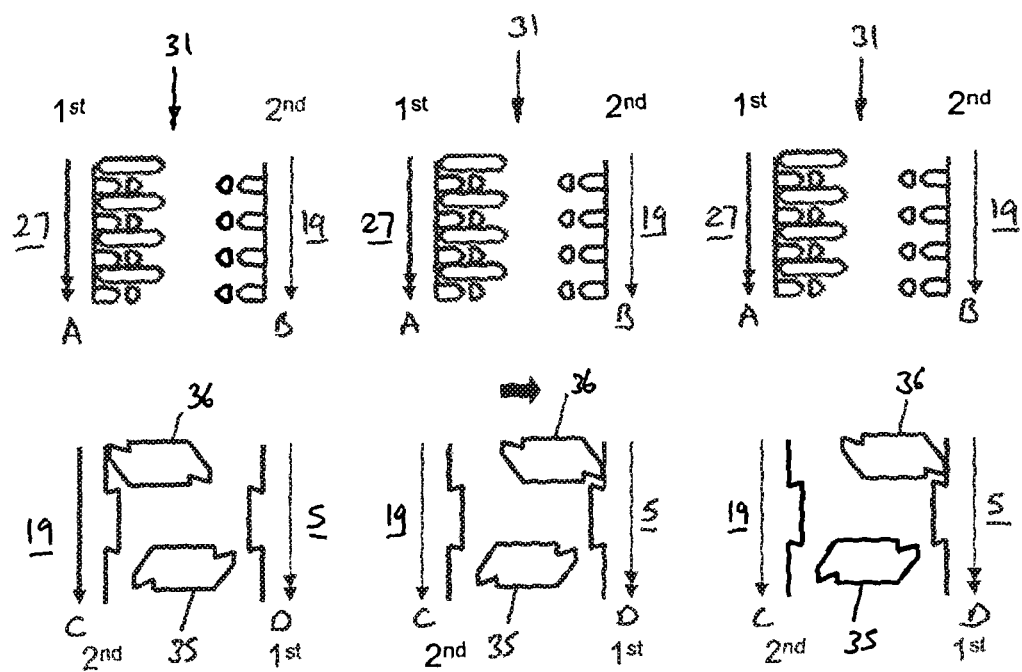
Figure 13:
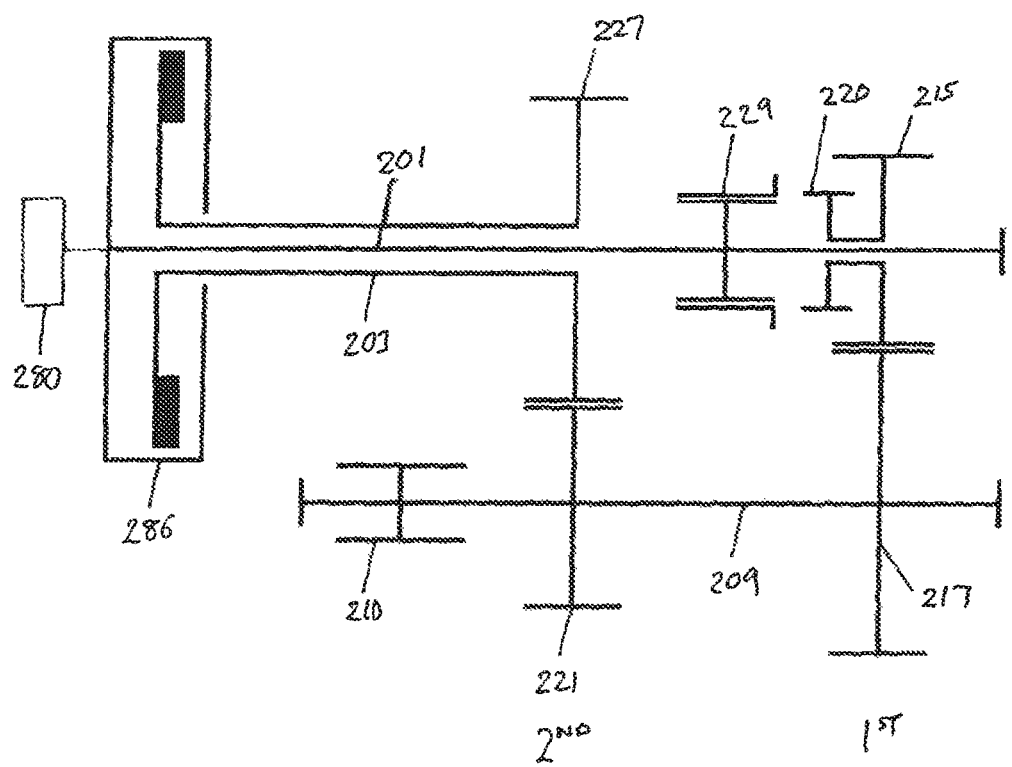
Figure 14:
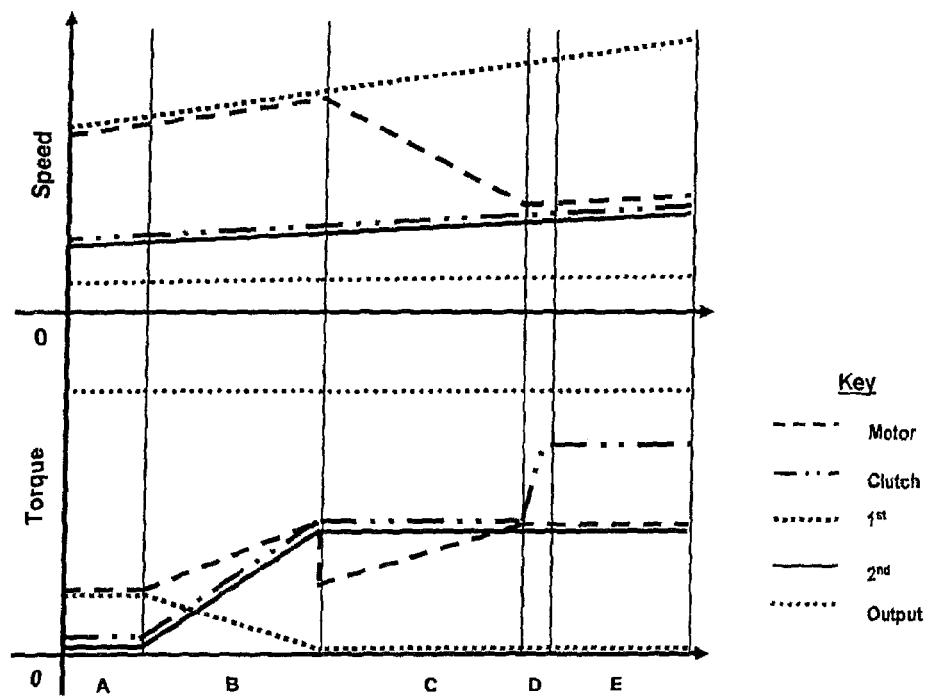
Figure 15:
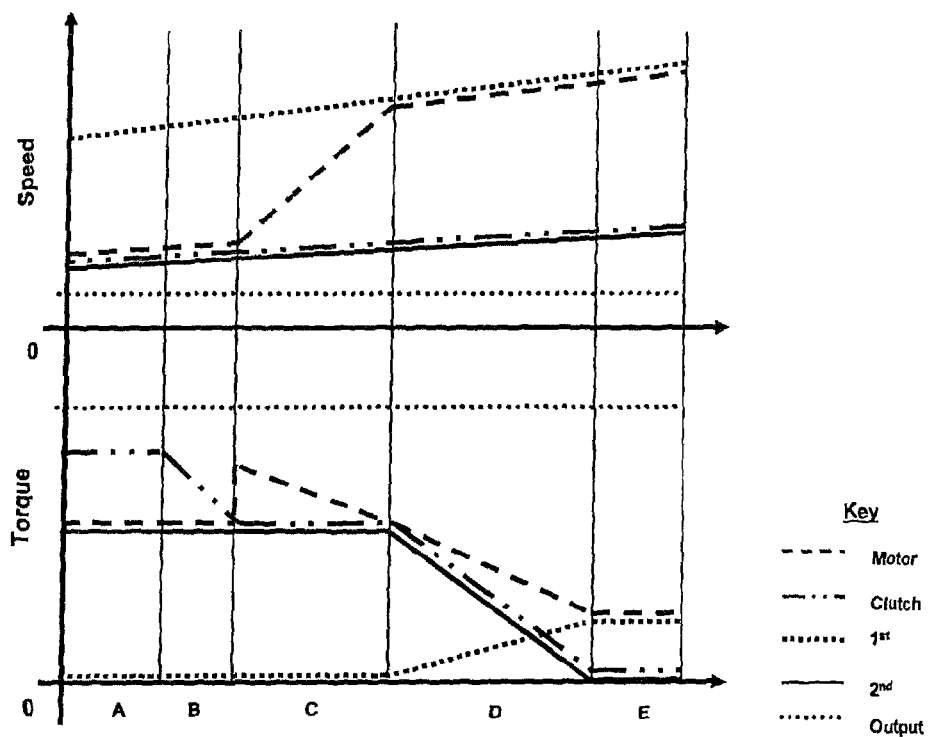

FIGS. 5a-c show torque pathways for the following conditions respectively: parked, launch in $1^{st}$ gear and driving in $1^{st}$ gear;

FIGS. 6 to 6g show the steps for a power on up shift;

FIG. 7 shows the torque pathway for driving in $2^{nd}$ gear;

FIGS. 8 to 8g show the steps for a power on down shift;

FIG. 9 shows the torque pathway for overrun in 1st gear;

FIGS. 10 to 10g show the steps for a power off up shift;

FIG. 11 shows the torque pathway for overrun in $2^{nd}$ gear;

FIGS. 12 to 12f show the steps for a power off down shift;

FIG. 13 is a schematic view of a second embodiment of the invention: 2 speed transmission system for use with an electric motor drive;

FIG. 14 shows the steps in a power on up shift;

FIG. 15 shows the steps in a power on down shift; and

Figure 16:
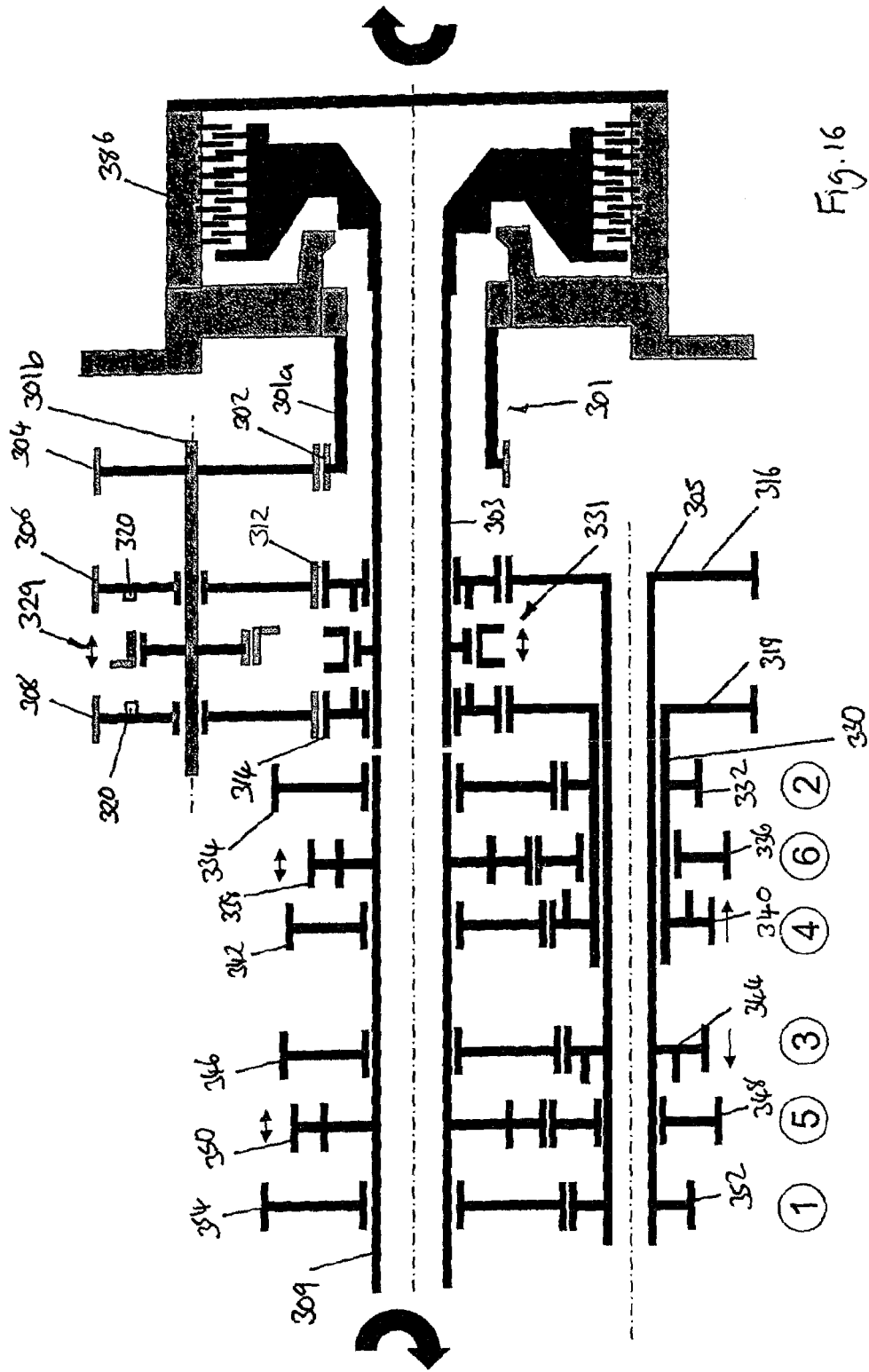

FIG. 16 is a schematic view of a third embodiment of the invention: 6 speed transmission system for use with a motor vehicle such as a motor cycle.

Figure 1A:
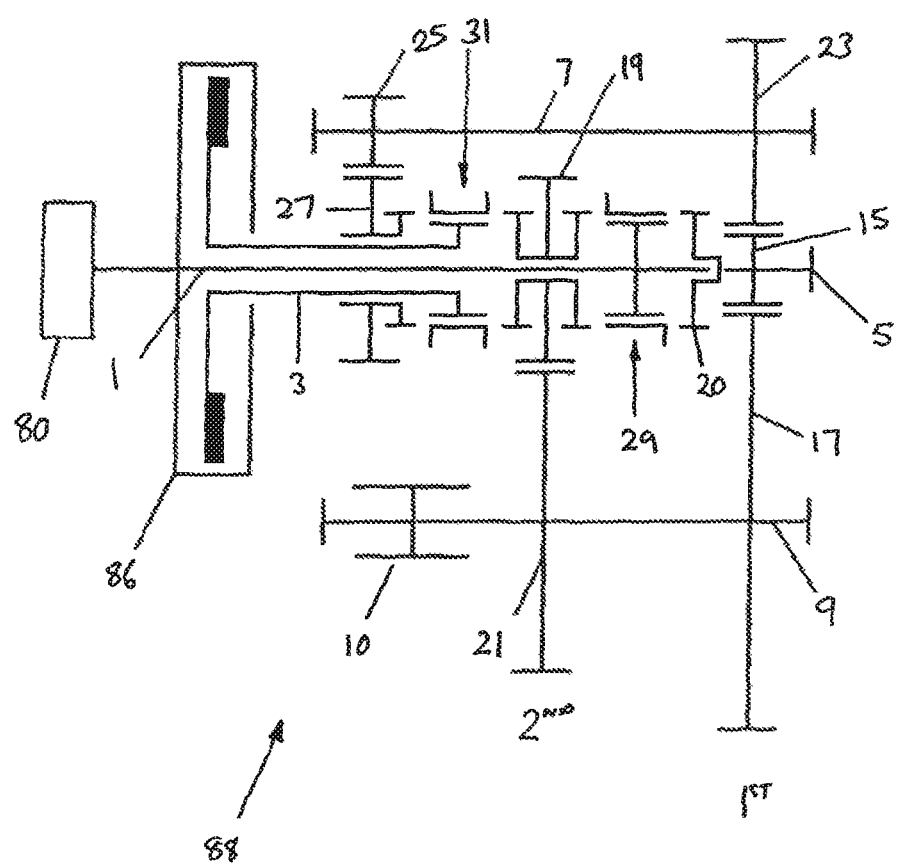
Figure 2:
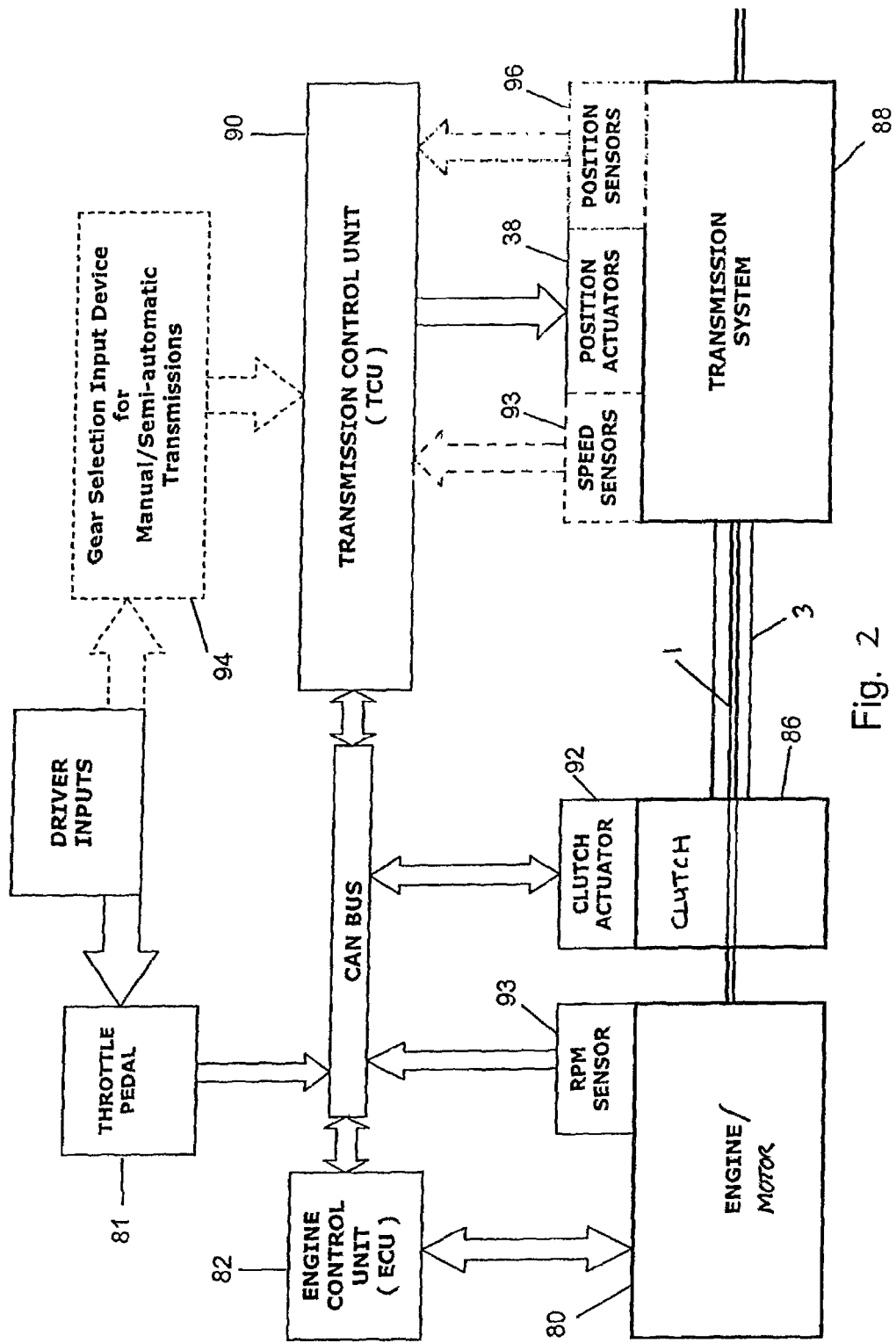
FIG. 2 is a schematic of a drive train and control system for the drive train in accordance with the invention.

FIG. 1a shows a drive train including a drive source 80 such as a combustion engine or electric motor, a clutch 86, a transmission 88 including a first input shaft 1, a second input shaft 3, a first lay shaft 5, a second lay shaft 7 and an output shaft 9. The layout depicted in FIG. 2 relates to a two-speed transmission, which includes first and second gears.

First gear includes a gear wheel 15 mounted on the first lay shaft 5, and fixed for rotation therewith, and a gear wheel 17 mounted on the output shaft 9 and fixed for rotation therewith. Second gear includes a gear wheel 19 rotatably mounted on the first input shaft 1 via a bearing, and a gear wheel 21 mounted on the output shaft 9 and fixed for rotation therewith.

The output shaft 9 is connected to a differential 10.

The first input shaft 1 is directly connected to the drive source 80. By directly connected it is meant that torque does not pass through the friction plates of the clutch 86, it may however have other intermediate components that provide a non-slippable drive between the drive source and the transmission, such as gears, etc. Preferably the first input shaft 1 is directly connected in the sense that it provides uninterruptible drive from the drive source 80 to the transmission 88.

The second input shaft 3 is connected to the drive source 80 via a friction clutch 86, which may be a dry friction clutch or a wet friction clutch. Thus the drive from the drive source 80 to the transmission 88 is interruptible by the clutch 86. The second input shaft 3 is tubular and houses at least part of the first input shaft 1, the arrangement being such that the first and second input shafts 1,3 are substantially co-axial. This is a very compact arrangement.

A first selector mechanism 29 is mounted on the first input shaft 1 and is arranged to selectively lock the gear wheel 19 for rotation with the first input shaft 1 and to selectively lock the first lay shaft 5 for rotation with the first input shaft 1 by selectively engaging drive formations 20 connected with the first lay shaft 5. In an alternative arrangement, the drive formations can be mounted on the gear wheel 15 and the gear wheel 15 can be rotatably mounted on the first lay shaft 5. The first selector mechanism 29 is of the instantaneous type, the structure and operation of which is described below.

A second selector mechanism 31 is mounted on the second input shaft 3 and is arranged to selectively lock the gear wheel 27 for rotation with the second input shaft 3. The second selector mechanism 31 is arranged to selectively lock the gear wheel 19 for rotation with the second input shaft 3. The second selector mechanism 31 is typically a conventional synchromesh type selector assembly. The gears 19,27 include appropriate drive formations 22 and synchronising cones 24 to compliment those of the second selector assembly 31. Because of the transmission layout, the synchronising cones can be small. Also, only one type of synchronising cone is required.

Although the second selector assembly 31 is preferably of the synchromesh type, other types of selector assembly can be used.

The transmission 88 also includes a transfer torque path, which links first gear with the second input shaft 3. The transfer torque path includes a gear wheel 23, which is fixed for rotation with the second lay shaft 7 and meshes with the gear wheel 15. A gear wheel 25 is fixed for rotation with the second lay shaft 7 and meshes with a gear wheel 27. The gear wheel 27 is rotatably mounted on the second input shaft 3 via a bearing. Thus the gear wheels 23,25,27, the second gear selector mechanism 31 and the second lay shaft 7 provide the torque transfer path between first gear and the second input shaft 3.

In this layout, the torque transfer path provides means to enable the torque in the transmission to be controlled to enable instantaneous power on down shifts to be performed (which is described in detail below).

The gear ratio of the gear wheel 11 to the gear wheel 23 is the inverse of the gear ratio of the gear wheel 27 to the gear wheel 25.

The first selector mechanism 29 is arranged to engage drive formations 20 located on the gear wheel 19. The first selector mechanism 29 is arranged to engage drive formations 20 located on the first lay shaft 5. The drive formations 20 comprise first and second groups of dogs. The first group of dogs is located on one side of the gear wheel 19. The second group of dogs is located on the first lay shaft 5. The dogs typically comprise three dogs evenly circumferentially distributed about the gear face/shaft, i.e. the angles subtended between the centres of a pair of dogs is approximately 120 degrees (see FIG. 3). Three dogs are used because the arrangement provides large engagement windows, that is the spaces between the dogs, to receive engagement elements from the first selector mechanism 29. Also, three dogs provide inherent self-centring and even load distribution. Large engagement windows provide greater opportunities for the first selector mechanism 29 to fully engage the gear 19 and the first lay shaft 5 before transmitting drive thereto.

The first selector mechanism 29 is mounted on the first input shaft 1 in between the dogs 20 mounted on the gear wheel 19 and dogs 20 mounted on the first lay shaft 5.

Figure 1B:
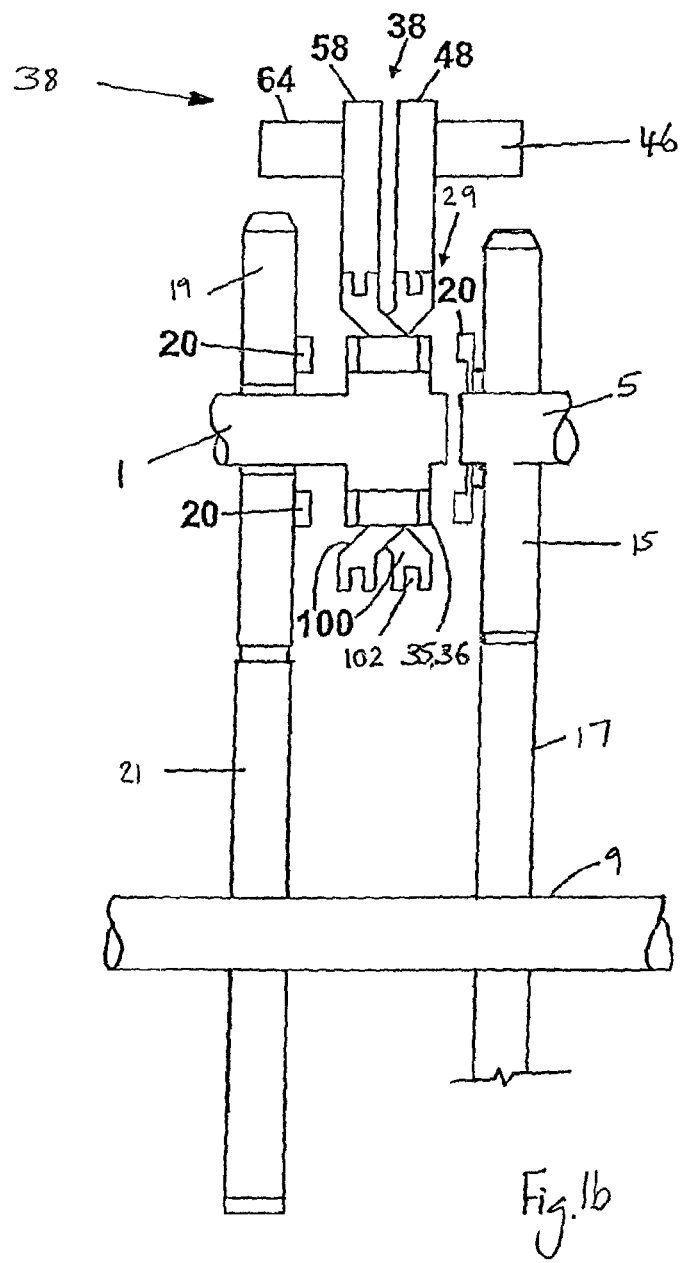

The first selector mechanism 29 includes first and second sets of engagement elements 35,36 and an actuator mechanism 38 (see FIG. 1b). The first and second sets of engagement elements 35,36 are mounted on the first input shaft 1. The first set of engagement elements 35 comprises three elements 28 that are evenly distributed about the first input shaft 1 such that their bases face inwards, and the axis of the elements 28 are substantially parallel. The second set of engagement elements 36 comprises three elements 30 which are similarly arranged about the first input shaft 1.

Figure 3:
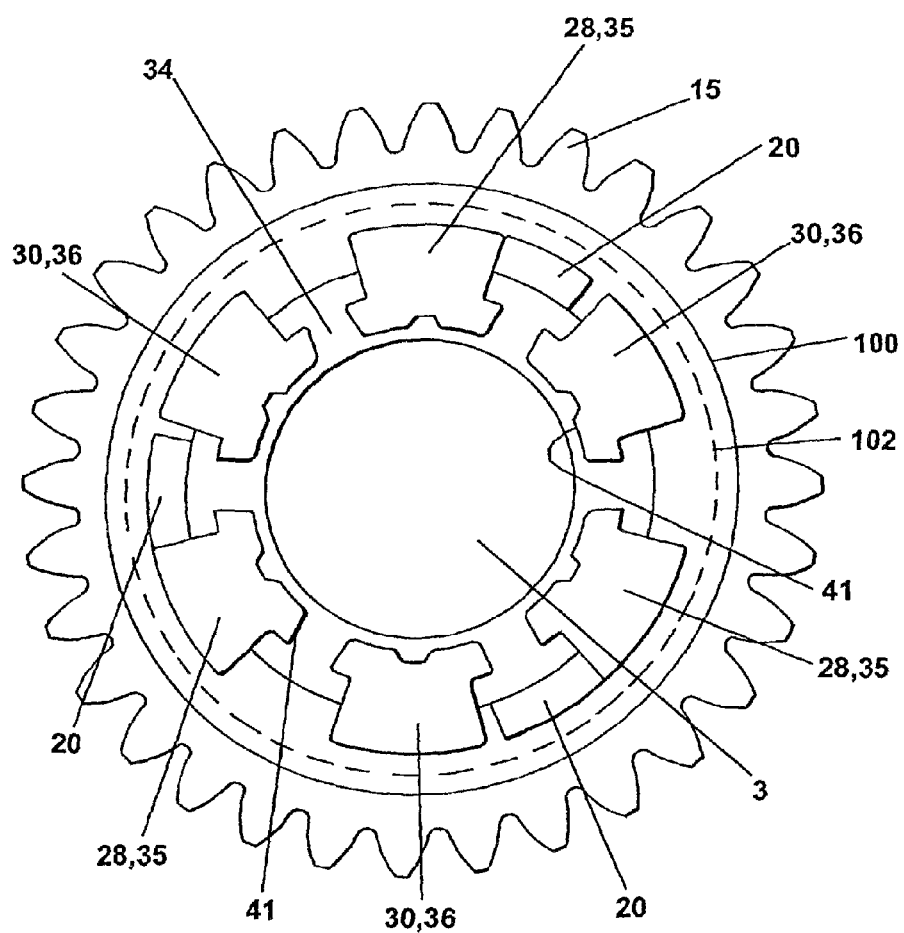
FIG. 3 is a schematic that shows the interaction of a selector mechanism and the dogs on the side of a gear wheel.

The sets of engagement elements 35,36 are mounted on a sleeve 34 which is mounted on the first input shaft 1 (see FIG. 3). The sets of engagement elements 35,36 are arranged to rotate with the first input shaft 1 but are able to slide axially along the sleeve 34 and hence the first input shaft 1 in response to a switching action of the actuator mechanism 38. To facilitate this, the sleeve 36 includes six key ways 41 formed in its curved surface which each engagement element 28,30 having a complimentary formation in its base. The key ways 41 may have substantially T-shaped profiles such that the elements are radially and tangentially (but do not axially) restrained within the key ways 41 (see FIG. 3). Alternatively, the key ways 41 can have slotted or dovetail profiles to radially restrain the elements or any other suitable shape.

Preferably the sets of elements are configured to be close to the first input shaft 1 to prevent significant cantilever effects due to large radial distances of loaded areas thus reducing the potential for structural failure.

The arrangement of the element sets 35,36 is such that elements of a particular set are located in alternate keyways 41 and the element sets 35,36 can slide along the sleeve 34. The elements in each element set are rigidly connected to each other by an annular connector member 100 and move as a unit. Each element set can move independently of the other. The connector member 100 has a groove 102 formed in its outer curved surface that extends fully around the connector member. The elements 28 in the first set of engagement elements 35 are preferably integrally formed with its connector member 100, though this is not critical. The elements 28 are evenly distributed about the connector member 100. The second set of engagement elements 36 comprises three elements 30, which are held in a similar fixed arrangement by a second connector member 100. When there is relative movement between the first and second sets of elements 35,36, the connector member 100 of the first element set 35 moves over the second set of elements 36 and the connector member 100 of the second element set 36 slides over the first set of elements 35.

Each element 28 in the first element set 35 has a first end 28a arranged to engage the first group of dogs 20 attached to the gear wheel 19 and a second end 28b arranged to engage the second group of dogs 20 on the first lay shaft 5. The first and second ends 28a,28b typically have the same configuration but are opposite handed, for example the first end 28a is arranged to engage the first group of dogs 20 during deceleration (reverse torque direction) of the gear wheel 19 and the second end 28b is arranged to engage the second group of dogs 20 during acceleration (forward torque direction) of the first lay shaft 5. Each element 30 in the second element set 36 is similarly arranged, except that the first end 30a is arranged to engage the first group of dogs 20 during acceleration of the gear wheel 19 and the second end 30b is arranged to engage the second group of dogs 20 during deceleration of the first lay shaft 5.

When both the first and second sets of engagement elements 35,36 engage one of the first and second sets of dogs 20, drive is transmitted in the forward and reverse torque directions.

The first and second ends 28a,30a,28b,30b of each element include an engagement face 43 for engaging the dogs 20, a ramp 45, an end face 42 and may include a shoulder 44 (see FIG. 4). The end faces 42 limit the axial movement of the engagement elements 28,30 by abutting the sides of the gear wheels. The engagement faces 43 may be angled to complement the sides of the dogs 20a so that as the engagement elements 28,30 rotate into engagement, there is face-to-face contact to reduce wear. Each ramp 45 is preferably helically formed and slopes away from the end face 42. The angle of inclination of the ramp 45 is such that the longitudinal distance between the edge of the ramp furthest from the end face 42 and the plane of the end face 42 is larger than the height of the dogs 20. This ensures that the transmission does not lock up when there is relative rotational movement between the engagement elements 28,30 and the dogs 20 that causes the ramp 45 to move towards engagement with the dogs 20. The dogs 20 do not crash into the sides of the engagement elements 28,30 but rather engage the ramps 45. As further relative rotational movement between the dogs 20 and the engagement elements 28,30 occurs, the dogs 20 slide across the ramps 45 and the helical surfaces of the ramps cause the engagement elements 28,30 to move axially along the input shaft 1 away from the dogs 20 so that the transmission does not lock up. Thus the first selector mechanism 29 is arranged to slip relative to its associated gear/shaft under certain operational conditions.

The arrangement of the first selector mechanism 29 is such that it inherently prevents lockup of the transmission occurring when selecting a new gear. Since there is only one instantaneous selector mechanism in the layout, the lockup problem does not affect this layout.

Thus the first selector mechanism 29 is arranged to selectively engage each of the gear wheel 19 and the first lay shaft 5 from operational modes that include the following modes: fully engaged in both torque directions; disengaged in both torque directions (neutral); engaged in the forward torque direction while disengaged in the reverse torque direction; and disengaged in the forward toque direction while engaged in the reverse torque direction. Since the first and second sets of engagement elements 35,36 can move independently of each other, it is possible to select the shaft 5 while the gear 19 is still engaged, and vice versa, and thus the selector mechanism 29 can perform instantaneous gearshifts since there is no loss of power when selecting the new gear 19/shaft 5, for at least some shift types.

When the elements of the first and second sets 35,36 are interleaved, as in FIG. 3, the engagement faces 43 of the first ends 28a of the first set of elements 35 are adjacent the engagement faces 43 of the first end 30a of the second set of elements 36. When the first and second sets of elements 35,36 are fully engaged with a gear shift, a dog 20 is located between each pair of adjacent engagement faces 43. The dimensions of the dogs 20 and the ends of the elements are preferably such that there is little movement of each dog between the engagement face 43 of the acceleration element and the engagement face 43 of the deceleration element when the gear moves from acceleration to deceleration, or vice versa, to ensure that there is little or no backlash in the gear.

When a gear wheel or shaft is engaged by both the first and second element sets 35,36 it is possible to accelerate or decelerate with very little backlash occurring when switching between the two conditions. Backlash is the lost motion experienced when the dog moves from the engagement face 43 of the acceleration element to the engagement face 43 of the deceleration element when moving from acceleration to deceleration, or vice versa. A conventional dog-type transmission has approximately 30 degrees of backlash. A typical transmission for a car in accordance with the current invention has backlash of less than four degrees.

The actuator mechanism 38 can include a shift cradle (not shown) that is arranged to actuate the first and second sets of engagement elements 35,36 using only a single actuator. Alternatively the actuator mechanism 38 can include first and second actuators 46,64 and first and second actuator members 48,58 (see FIG. 1b). The first and second actuators 46,64 are force generator actuators and preferably part of an electrical system for example, an electro-mechanical system or an electro-hydraulic system. The first and second actuator members 48,58 are mechanical drive members that transmit force from the first and second actuators to 46,64 to the sets of engagement members 35,36 and are preferably in the form of independently controllable forks. Accordingly, the first set of engagement elements 35 is driven by the first actuator 46 via the first fork 48 and the second set of engagement elements 36 is driven by the second actuator 64 via the second fork 58. Thus the first and second sets of engagement elements 35,36 move totally independently of each other.

Optionally the actuator mechanism 38 may include resilient means, such as helical springs (not shown). The springs are arranged to bias the first and second sets of engagement elements 35,36 to move in an axial direction when they are in driving engagement with a gear wheel and are unable to move.

The movement of the first and second sets of engagement elements 35,36 is controlled by the transmission control unit 90 (see layout of FIG. 1c) for automatic and semi-automatic versions of the transmission 88, however with this layout it is possible to have an entirely manual transmission, in which case the transmission control unit is not strictly required.

The transmission control unit 90 is an electronic logic control system driven by software that is arranged to control operation of the first and second actuators 48,64 and hence the first and second sets of engagement elements 35,36. It is the sequence programming that enables the transmission control unit 90 to automatically control the transmission to prevent conflict shifts occurring. Being able to control the actuation of the first and second sets of engagement elements 35,36 totally independently by use of first and second actuators 46,64 and the first and second actuator members has the advantage that the magnitude and the timing of application of the biasing force applied by each actuator can be independently and accurately controlled.

For fully automatic transmissions 88 gear selections are made by the transmission control unit 90 when the drive source control unit 82 detects predetermined operational conditions, for example when the drive source 80 reaches a particular speed in a particular gear. For semi-automatic transmissions 88 gear selections are made by the user of the drive system by initiating the gear selection input device 94, for example a gear lever (manual) or switches located adjacent the steering wheel (semi-automatic). The transmission 88 can be arranged such that it is possible to select between the automatic and manual modes.

FIG. 1c shows schematically a drive system including the transmission system 88. The drive system includes the drive source 80, a drive source control unit 82, the clutch 86 which is typically a friction clutch and the transmission control unit 90.

The drive source 80 is typically an internal combustion drive source in a vehicle but may be an electric motor for electric vehicles or any other suitable drive source. The output of the drive source 80 is largely determined by the driver loading a throttle input device 81 (typically a throttle pedal), which is connected to the drive source via a throttle interface 83 and the drive source control unit 82. The drive source control unit 82 (such as an engine control unit or a motor control unit) is arranged to monitor and adjust the output of the drive source 80 in accordance with instructions received from the user and/or the transmission control unit 90. The drive source control unit 82 may be a throttle potentiometer type system or alternatively an electronic control system (sometimes called a "drive by wire" system).

The drive source control unit 82 communicates with the transmission control unit 90 via a Controller Area Network (CAN) bus.

Operation of the transmission will now be described with reference to FIGS. 5a to 12f. In FIGS. 6, 8, 10 and 12 the stages marked "a" to "g" on the graphs correspond with respective Figures a to g showing the positions of the first and second selector mechanisms 29,31 at the corresponding stage.

FIG. 5a shows the positions of the first and second selector mechanisms 29,31 when in the parked condition. The second selector mechanism 31 engages the gear wheel 19 and the first selector mechanism 29 engages the first lay shaft 5. Thus by appropriate positioning of the selector mechanism 29,31 it is possible to lock the transmission and thereby provide a parking function. The clutch is in the closed condition.

FIG. 5b shows the positions of the first and second selector mechanisms 29,31 for the launch condition in first gear. The second selector mechanism 31 is moved to a neutral condition. The first selector mechanism 29 is fully engaged with the first lay shaft 5. The torque path passes from the drive source 80 to the transmission 88 via the first input shaft 1, through the first selector mechanism 29, the first lay shaft 5 and gear wheels 17 and 17 to the output shaft 9. It can be seen from FIG. 5b that the second set of engagement elements 36 are drivingly engaged with the first lay shaft 5. The first set of engagement elements 35 are in an unloaded condition. The arrow A in FIG. 5b indicates the direction of torque. The clutch is in the closed position.

FIG. 5c shows the positions of the selector mechanisms 29,31 and the torque path when driving in first gear. After launch, the second selector mechanism 31 is moved into engagement with the gear wheel 27 thereby locking the gear wheel 27 for rotation with the second input shaft 3. The first (unloaded) engagement member set 35 is moved to a neutral position. The second engagement element set 36 remains drivingly engaged with the first lay shaft 5. The direction of torque is shown by arrow A in FIG. 5c. The clutch is in the closed position. Torque is supplied to the output shaft 9 via the same torque path as mentioned with reference to FIG. 5b. In addition torque is supplied from the second input shaft 3 to the output shaft 9 via the second selector mechanism 31, the gear wheels 27,25, the second lay shaft 7, and gear wheels 23,15, 17.

FIGS. 6 to 6g show a power on up shift strategy from first to second gear. FIGS. 6 and 6a show the initial condition of the transmission when the power on up shift is requested. The clutch 86 is closed, the second selector mechanism 31 is in engagement with the gear wheel 27, the first engagement element set 35 of the first selector mechanism 29 is in a neutral position and the second engagement element set 36 drivingly engages the first lay shaft 5. The arrows A and B in FIG. 6a show the relative speeds of the gear wheel 27 and 19. The double-headed arrow A indicates that the gear wheel 27 is rotating faster than the gear wheel 19. The arrows C and D in FIG. 6a indicate the direction and relative rotational speeds of the gear wheel 19 and the first lay shaft 5 (and hence the first gear wheel 15). The double-headed arrow D indicates that the first lay shaft 5 is rotating faster than the gear wheel 19.

FIGS. 6 and 6a show that the conditions that apply when the shift request is made.

FIGS. 6 and 6b indicate that the next step is to open the clutch 86. The first and second selector mechanisms 29,31 do not move at this stage. The effect of opening the clutch on relative torques and speeds of the drive source, clutch, first gear, second gear and output are shown in FIG. 6. The next stage is for the clutch 86 to be synchronised with the speed of $2^{nd}$ gear (gear wheel 19). This is achieved by moving the second selector mechanism 31 out of engagement with the gear wheel 27 and into engagement with the gear wheel 19. The clutch 86 torque capacity is then increased to substantially match the clutch torque to the drive source torque (see FIGS. 6 and 6*d*). The speed of the drive source 80 is then synchronised to the speed of the second gear (gear wheel 19) and the second set of engagement elements 36 is moved out of engagement with the first lay shaft 5 and into engagement with the gear wheel 19. The clutch 86 is then closed (see FIGS. 6 and 6*e-g*) and the shift is completed.

FIG. 7 shows the torque path when driving in $2^{nd}$ gear. Torque passes from the drive source 80, through the clutch 86, the second input shaft 3, the second selector mechanism 31 and gear wheels 19 and 21 (second gear) to the output shaft 9. The second set of engagement elements 36 of the first selector mechanism 29 engages the gear wheel 19.

FIGS. 8 to 8*g* show the steps in a power on down shift from $2^{nd}$ gear to $1^{st}$ gear. FIGS. 8 and 8*a* show the condition of the transmission 88 and drive source 80 at the time of the request for the power on down shift. When a shift request is made, the clutch torque capacity 86 is reduced so that the clutch 86 is set to a slip condition. The first selector mechanism 29 is actuated to disengage the gear wheel 19 and to move the second set of engagement elements to a neutral position. This enables the drive source speed to increase. The speed of the drive source 80 is then synchronised to the speed of first gear (and hence first lay shaft 5) and the first selector mechanism 29 is actuated to engage the first lay shaft 5 with the second set of engagement elements 36 (see FIGS. 8 and 8*c*). The clutch 86 torque capacity is then reduced until the clutch 86 is fully opened (see FIGS. 8 and 8*d*). As this happens, the output torque begins to rise as does the torque generated by first gear. The clutch speed is then synchronised to first gear (and hence first lay shaft 5) and the second selector mechanism 31 is operated to disengage the gear wheel 19 and to select the gear wheel 27 (see FIGS. 8 and 8*e*). The clutch 86 torque capacity is then quickly increased until the clutch 86 is closed to complete the shift (see FIGS. 8, 8*f* and 8*g*).

FIG. 9 shows the torque path for overrun in first gear, which is the condition prior to a power off up shift.

FIGS. 10 to 10*g* show a power off up shift from first gear to second gear. FIG. 10 provides an overview for the power off up shift. FIGS. 10 and 10*a* show the condition of the transmission 88 at the shift request. At the time of the request, the clutch 86 is closed. After the request, the clutch 86 torque capacity is reduced until a slip condition is achieved. The first selector mechanism 29 is actuated to move the second set of engagement elements 36 out of engagement with the first lay shaft 5 (see FIG. 10*d*). The drive source 80 is synchronised to second gear (gear wheel 19) and the first selector mechanism engages the gear wheel 19 with the second set of engagement elements 36 (see FIG. 10*c*). The clutch 86 torque capacity is then reduced until the clutch 86 is fully open (see FIG. 10*d*). The clutch speed is then synchronised to second gear (gear wheel 19) and the second selector mechanism 31 disengages the gear wheel 27 and engages the gear wheel 19. The clutch 86 is then closed to complete the shift.

FIG. 11 shows the torque path for overrun in second gear, which is the condition prior to a power off down shift.

FIGS. 12 to 12*f* show the steps in a power off down shift from second gear to first gear. FIGS. 12 and 12*a* show the condition of the transmission 88 when the shift request is made. The clutch 86 torque capacity is reduced until the clutch 86 is opened. The clutch speed is then synchronised to first gear speed (speed of first lay shaft 5). The second selector mechanism 31 disengages the gear wheel 19 and engages the gear wheel 27. The clutch torque is substantially matched to the drive source torque. The drive source speed is substantially matched to first gear speed (speed of first lay shaft 5) and the first selector mechanism 29 is actuated to disengage the gear wheel 19 and moved into engagement with the first lay shaft 5. The clutch torque capacity is increased until the clutch is fully closed to complete the shift.

It will be appreciated by the skilled person that torque spikes are substantially eliminated by the speed synchronisation steps in the shift strategies prior to engaging the new gear. Synchronisation is possible because the transmission layout provides two drive input paths: one directly from the drive source and the other from the drive source via a clutch device. It also enables at least some torque to be supplied to the output shaft during a shift, which ensures that there is no loss of drive during a shift.

It will be appreciated by the skilled person from the description of the shift strategies that for the two speed arrangement that only one of the sets of engagement members 36 is used during all shift types. Thus it is possible to use a first selector mechanism with the other set of engagement members 35 omitted for the two speed transmission. However there is a benefit to having both sets of engagement members 35,36 to provide the parking function.

Having both sets of engagement members 35,36 is particularly useful for transmission systems having more than two gears (see below).

FIG. 13 shows a second embodiment of the invention. The second embodiment provides a 2-speed transmission 288 for an electric vehicle. The drive train for the vehicle includes a drive source 280, which is typically an electric motor, and a friction clutch device 286. The vehicle includes a similar control functions to that shown in FIG. 2 of the first embodiment, and includes a transmission control unit 90, motor control unit 82, CAN BUS, throttle pedal 81, input device 94, motor speed sensor 93, clutch actuator 92, position actuators 38 and, optionally, transmission speed sensors 93 and transmission position sensors 96.

The transmission system includes a first input shaft 201 that is directly connected to the output of the electric motor 280 and a second input shaft 203 that is connected to the output of the electric motor 280 via the clutch 286. The transmission includes an output shaft 209, which is connected to a differential 210.

The first input shaft 201 is arranged substantially coaxially with the second input shaft 203. The second input shaft 203 is tubular, or at least includes a tubular section, and is arranged to house at least part of the first input shaft 201.

First gear includes a gear wheel 215 rotatably mounted on the first input shaft, which is arranged to mesh with a gear wheel 217 that is fixed for rotation with the output shaft 217. Second gear includes a gear wheel 217 that is fixed for rotation with the second input shaft 203, which is arranged to mesh with a gear wheel 221 that is fixed for rotation with the output shaft 209.

The gear wheel 215 includes drive formations 220, which are similarly arranged to the drive formations of the first embodiment.

A gear selector mechanism 229 is arranged to selectively lock the gear wheel 215 for rotation with the first input shaft 215. The selector mechanism 229 includes first and second sets of engagement members 235,236 that are arranged to selectively engage the drive formations 220. The selector mechanism 229 is arranged similarly to the instantaneous type selector mechanism 29 described in the first embodiment, however because the selector mechanism 229 is only arranged to lock one gear wheel (gear wheel 215) for rotation with the first input shaft 201, it is only necessary for each of the engagement members to include operative parts such as a drive face 43 and a ramp 45 at the end that engages the gear wheel 215. Accordingly the width of the selector mechanism 215 can be reduced, which reduces the spacing between the gear wheels 215 and 217 thereby providing a more compact transmission.

The selector mechanism can selectively lock the gear wheel 215 for rotation with the first input shaft 201 in a similar manner to the first embodiment, i.e. each of the four locking modes are available.

In this embodiment the control system, which includes the transmission control unit and motor control unit 82, is programmed such that gear shifts between the first and second gears are only allowed under load, that is the transmission 88 is restricted to performing power on up shifts and power on down shifts. This enables a very simple transmission layout to be provided, that is very compact, and that can provide substantially seamless (instantaneous) shifts for power on up shifts and power on down shifts.

FIG. 14 shows a preferred shift strategy for a power on up shift from first gear to second gear. The strategy includes the following steps:

A. Shift Request is Made by the Driver or a Vehicle Control System, such as the Motor Controller When driving in first gear, the gear wheel 215 is engaged by the first and second sets of engagement elements 35,36. One of the first and second sets is in a loaded condition and the other is in an unloaded condition. When the shift request is made the transmission control unit 90 checks the direction of torque and determines whether or not the shift is permissible, i.e. determines whether a power on shift request has been made. When the transmission control unit 90 determines that a power on up shift has been requested, the unloaded set of engagement elements is disengaged from the gear wheel 215.

The drive torque path from the motor 280 to the output shaft 210 via the selector mechanism 229.

B. Close Clutch and Disengage the Loaded Set of Engagement Elements

The clutch 286 torque capacity is increased while increasing motor 280 torque at a specific rate to compensate for the torque drop felt over the large ratio between first and second. This ensures that the output shaft torque remains substantially constant throughout the shift event. The handover of drive from the first gear to second gear takes place at the time at which the clutch torque equals the motor torque. At this stage there is a handover of torque from the selector mechanism 229 to the clutch 286 and hence to second gear.

C. Synchronise Motor to Second Gear Speed

Now that the clutch 286 is maintaining output shaft torque, the motor 280 can synchronise its speed to second gear speed (speed of gear wheel 217) by reducing the torque in the motor 280 until the speeds are substantially matched.

D. Clutch Lock-Up

Both the clutch 286 and the motor side of the transmission 288 are now synchronised in speed allowing the clutch 286 to fully close.

E. Shift Complete

FIG. 15 shows a preferred strategy for a power on down shift (sometimes referred to as a kick-down shift) from second gear to first gear, which includes the following steps:

A. Shift Request

A down-shift is requested by the driver or an motor management system while delivering positive drive torque. The transmission system determines the direction of torque to ensure that the shift is permissible. At this instance drive torque is from the clutch 286, which is connected to second gear.

B. Clutch to Slip

The clutch torque capacity is reduced to the point of slip where clutch torque capacity is substantially equal to motor torque. Since the clutch 286 is driving the output shaft 209, clutch torque capacity must be maintained to prevent the driver perception of the shift.

C. Synchronise Motor to First Gear Speed and Selector Mechanism Drive Engagement The clutch 286 is driving the output shaft 209, and motor speed is increased by the control system increasing the torque of the motor 280. The engaging set of engagement elements 35,36 can be engaged at any point, even if a speed difference exists (the relative speeds of rotation), without compromising the life of the components. Typically the transmission controller controls engagement such that the speed difference is approximately zero.

1. Open Clutch and Drive Torque Handover

The clutch torque capacity is progressively reduced until the clutch 286 is fully open. During the handover, clutch torque capacity is reduced and hence torque is reduced across second gear. Since the gear 215 was engaged by the selector mechanism 229 prior to torque handover, the torque picks-up progressively across first gear relative to the release of the clutch 286. Motor torque is also reduced at a specific rate while reducing the clutch torque capacity to maintain a substantially constant output torque. That is, sufficiently constant such that the driver will experience constant torque at the output.

1. Shift Complete

An advantage of these strategies is that the output torque remains substantially constant throughout the shift. Furthermore, the power on downshift is substantially seamless.

FIG. 16 shows a third embodiment of the invention. The third embodiment is a multi-speed transmission 388. FIG. 16 shows a six-speed transmission with odds and even gears grouped together. It will be appreciated by the skilled person that the transmission layout is scalable to any number of gears by add/subtracting gear trains. The transmission shown is particularly suitable for vehicles such as motorcycles.

The transmission system can be arranged as a fully automatic, semi-automatic or fully manual transmission. For fully automatic and semi-automatic arrangements, the vehicle includes a similar control functions to that shown in FIG. 2 of the first embodiment, and includes a transmission control unit 90, drive source control unit 82, CAN BUS, throttle control 81, input device 94, drive source speed sensor 93, clutch actuator 92, position actuators 38 and, optionally, transmission speed sensors 93 and transmission position sensors 96.

The transmission system 388 includes a first input shaft 301 that is directly connected to the output of the drive source 380 and a second input shaft 303 that is connected to the output of the drive source 380 via the clutch 386. At least part of the first input shaft 301 is arranged substantially parallel to the second input shaft and is spaced apart therefrom, i.e. it is non-coaxial with the second input shaft 303.

The first input shaft 301 includes a first part 301a that is tubular and that is arranged to house a part of the second input shaft 303 in a co-axial fashion, and a second part 301b that is non-coaxial. The first and second parts 301a,301b are connected by gear wheels 302,304, which are fixed for rotation with the first and second parts 301a,301b respectively.

Two gear wheels 306,308 are rotatably mounted on the second part of the first input shaft 301b by bearings. Each of the gear wheel 306,308 can be selectively locked for rotation with the first shaft 301b by a selector mechanism 329, which is arranged similarly to the instantaneous type selector mechanism 29 of the first embodiment. Therefore each gear wheel 306,308 can be selectively locked for rotation with the first input shaft 301b using one of the four operational modes. Furthermore, the selector mechanism 329 is arranged to engage one of the gear wheels 306,308, while the other gear wheel is still engaged so that substantially seamless (instantaneous) shifts can be provided. The gear wheels 306,308 include drive formations 320 similar to the drive formations 20 in the first embodiment.

The gear wheel 306 meshes with a gear wheel 312, which is rotatably mounted on the second input shaft 303 by a bearing. The gear wheel 308 meshes with a gear wheel 314, which is rotatably mounted on the second input shaft 303 via a bearing. The gear wheels 312,314 are selectively locked for rotation with the second input shaft 303 by a second selector mechanism 331. The second selector mechanism 331 is a synchromesh type selector mechanism, and each of the gear wheels 312,314 include the appropriate engagement formations and synchronisers.

The transmission system 388 includes a lay shaft 305 and an output shaft 309. The gear wheel 312 meshes with a gear wheel 316 fixed for rotation with the lay shaft 305. The gear wheel 314 meshes with a gear wheel 318 that is rotatably mounted on the lay shaft 305 via a sleeve 330 and bearings.

First to sixth gears are arranged to transfer torque between the lay shaft 305 and the output shaft 309. The odd gears are grouped together and the even gears are grouped together. When looking from right to left in FIG. 16 the gears are ordered as follows: $2^{nd}$, $6^{th}$, $4^{th}$, $3^{rd}$, $5^{th}$, $1^{st}$.

$2^{nd}$ gear includes a gear wheel 332 fixed for rotation with the sleeve 330 and a gear wheel 334 rotatably mounted on the output shaft 309 via a bearing. $6^{th}$ gear includes a gear wheel 336 that is rotatably mounted on the sleeve 330 via a bearing and a gear wheel 338 that is fixed for rotation with the output shaft 309, and that is arranged to slide axially along the shaft. $4^{th}$ gear includes a gear wheel 340 that is fixed for rotation with the sleeve 330 and is arranged to slide axially along the sleeve, and a gear wheel 342 that is rotatably mounted on the output shaft via a bearing 342.

The gear wheel 338 acts as a first pre-select device and is arranged to selectively lock the gear wheels 342 and 334 for rotation with the output shaft 309, by sliding into and out of engagement with those gear wheels.

The gear wheel 340 acts as a second pre-select device and is arranged to selectively lock the gear wheel 336 for rotation with the sleeve 330.

$3^{rd}$ gear includes a gear wheel 344 fixed for rotation with the lay shaft 5, and arranged to slide axially along the shaft 5, and a gear wheel 346 rotatably mounted on the output shaft 309 via a bearing. $5^{th}$ gear includes a gear wheel 348 rotatably mounted on the lay shaft 305 via a bearing and a gear wheel 350 fixed for rotation with the output shaft 309, and arranged to slide axially along the shaft. $1^{st}$ gear includes a gear wheel 352 fixed for rotation with the lay shaft 305 and a gear wheel 354 rotatably mounted on the output shaft 354 via a bearing.

The gear wheel 344 acts as a pre-select device to selectively lock the gear wheel 348 for rotation with the lay shaft 305, by sliding axially into and out of engagement with that gear wheel. The gear wheel 350 acts as a pre-select device to selectively lock the gear wheels 346,354 for rotation with the output shaft 9.

The pre-select devices are arranged in the manner of a synchromesh selector device or dog clutch device, and therefore can only engage one gear wheel 342,334 at a time. The gears that are selected include the appropriate drive formations.

The transmission provides seamless shifts for all shift types by pre-selecting the appropriate gear and then controlling torque using the first and second selector devices 329, 331. A substantially shock free engagement can be provided by synchronising the speed of the drive source and/or clutch with the new gear prior to making the shift.

In this layout, the instantaneous selector mechanism 329 provides a torque support function and the shifts are made using the second selector mechanism 329. This is the case for layouts where the first and second input shafts are not entirely co-axial.

The transmissions can be used in vehicle and non-vehicle applications. Typical vehicles include cars, lorries, motorcycles, buses, vans, all wheel drive vehicles, tractors, construction vehicles, excavation vehicles, military vehicles. Non-vehicle applications include manufacturing machines, wind turbines, etc.

The invention claimed is:

1. A transmission system including:
   a first input shaft that is arranged to receive drive directly from a drive source, and a second input shaft that is arranged to receive drive from the drive source via a drive interruption means, and
   a first gear element rotatable relative to the first input shaft and a first selector assembly for selectively locking the first gear element for rotation with the first input shaft from operational modes that include the following modes: lock the gear element for rotation with the first input shaft in forward and reverse torque directions, lock the gear element for rotation with the first input shaft in the forward torque direction and not lock in the reverse torque direction; and lock the gear element with rotation with the first input shaft in the reverse torque direction and not lock in the forward torque direction.

2. A transmission system according to claim 1, including a second gear element rotatably mounted on the second input shaft and a second selector assembly for selectively locking the second gear element for rotation with the second input shaft.

3. A transmission system according to claim 2, wherein the second selector assembly is a non-instantaneous selector assembly.

4. A transmission system according to claim 1, including a torque transfer pathway between the first gear element and the second input shaft.

5. A transmission system according to claim 1, including a third gear element rotatably mounted on the first input shaft, wherein the first selector assembly is arranged to lock the third gear element for rotation with the first input shaft from operational modes that include the following modes: lock the third gear element for rotation with the first input shaft in forward and reverse torque directions, lock the third gear element for rotation with the first input shaft in the forward torque direction and not lock in the reverse torque direction and lock the third gear element with rotation with the first input shaft in the reverse torque direction and not lock in the forward torque direction.

6. A transmission system according to claim 5, including a fourth gear element rotatably mounted on the second input shaft, wherein the second selector assembly is arranged to selectively lock the fourth gear element for rotation with the second input shaft.

7. A transmission system according to claim 5, wherein the first and second gear elements are in meshing engagement.

8. A transmission system according to claim 6, wherein the third and fourth gear elements are in meshing engagement.

9. A transmission system according to claim 5, including a fifth gear element mounted on a lay shaft, said fifth gear element being in meshing engagement with the second gear element.

10. A transmission system according to claim 6, including a sixth gear element mounted on a lay shaft, the sixth gear element being in meshing engagement with the fourth gear element.

11. A transmission system according to claim 10, wherein the sixth gear element is rotatably mounted on the lay shaft via a gear support member, which is preferably a sleeve member.

12. A transmission system according to claim 11, including at least one gear train for transferring torque from the gear support member to an output shaft, said gear train including a seventh gear element mounted on the gear support member and an eighth gear element mounted on the output shaft.

13. A transmission system according to claim 9, including at least one gear train for transferring torque from the lay shaft to an output shaft, said gear train including a ninth gear element mounted on the lay shaft and a tenth gear element mounted on the output shaft.

14. A transmission system according to claim 12, including at least one pre-select gear selector assembly that is arranged to preselect a gear prior to a shift taking place, said shift being implemented by operation of the first and/or second selector assemblies.

15. A transmission system according to claim 14, wherein the pre-select gear selector assembly includes a slidable gear element that is mounted on any one of the gear support member, the lay shaft and the output shaft and is arranged such that the slidable gear element rotates with the gear support member, the lay shaft or the output shaft, respectively, and is arranged to slide axially along the gear support member, the lay shaft or the output shaft, respectively, to move into and out of engagement an adjacent gear element to selectively lock the adjacent gear element with the gear support member, the lay shaft or the output shaft, respectively.

16. A transmission system according to claim 1, wherein the first input shaft includes first and second parts connected together via a gear train, wherein the first part is tubular and is arranged to house at least part of the second input shaft, the arrangement being such that the first part is substantially coaxially with the second input shaft.

17. A transmission system according to claim 1, wherein one of the first and second input shafts is tubular and houses at least part of the other of the first and second input shafts, the arrangement being such that at least part of the shafts are substantially co-axial.

18. A transmission system according to claim 1, including a second gear element fixed for rotation with the second input shaft, a third gear element mounted on an output shaft, said third gear element being in meshing engagement with the second gear element.

19. A transmission system according to claim 1, including a fourth gear element mounted on an output shaft, said fourth gear element being in meshing engagement with the first gear element.

20. A transmission system according to claim 1, wherein the first selector assembly includes first and second sets of engagement members, wherein each engagement member includes an engagement face at one end only.

21. A transmission system according to claim 1, including a control system for controlling operation of the transmission system.

22. A transmission system according to claim 21, that is programmed to prevent power off shifts occurring.

23. A transmission system according to claim 1, arranged such that, when driving in a 1st gear, torque is provided from the drive source to the 1st gear train via both the first and second input shafts.

24. A transmission system according to claim 1, arranged such that, when in overrun in a 1st gear, torque is routed from an output shaft to the second input shaft via the 1st gear.

25. A transmission system according to claim 1, arranged such that, when driving in a 2nd gear, torque is routed from the second input shaft to an output shaft via the 2nd gear.

26. A transmission system according to claim 1, arranged such that, when in overrun in a 2nd gear, torque is routed from an output shaft to first and second input shafts via the 2nd gear.

27. A method for performing a power on up shift in a transmission system according to claim 1, including: in response to the up shift request, opening the clutch device; synchronising the speed of the friction clutch device to the speed of a 2nd gear; matching the clutch torque to the drive source torque; synchronising the drive source speed to the speed of the 2nd gear; and closing the friction clutch device to complete the shift.

28. A method for performing a power on up shift in a transmission system according to claim 1, including in response to the up shift request, an unloaded set of engagement members is disengaged from the first gear element; increasing the clutch torque capacity until it is substantially at a maximum; removing the formerly loaded set of engagement members from the first gear element; and synchronising the speed of the drive source to the speed of a 2nd gear.

29. A transmission system according to claim 1, including first and second lay shafts, and an output shaft.

30. A transmission system according to claim 1, arranged such that when performing power on up shifts, torque is switched from the first input shaft to the second input shaft; for power off up shifts, torque is switched from the second input shaft to the first input shaft; for performing power off downshifts, torque is switched from the first input shaft to the second input shaft; and/or for power on downshifts, torque is switched from the second input shaft to the first input shaft.

31. A transmission system according to claim 2, wherein the second selector assembly is arranged to selectively lock the first gear element for rotation with the second input shaft.

32. A transmission system according to claim 29, including a third gear element mounted on the first lay shaft, a fourth gear element fixed for rotation with the output shaft, which meshes with the third gear element mounted on the first lay shaft, and a fifth gear element fixed for rotation with the output shaft, which meshes with the first gear element.

33. A transmission system according to claim 32, including a sixth gear element fixed for rotation with the second lay shaft, which meshes with the second gear element, and a seventh gear element fixed for rotation with the second lay shaft, which meshes with the third gear element mounted on the first lay shaft.

34. A transmission system according to claim 1, wherein the drive interruption means comprises a friction clutch device.

35. A transmission system according to claim 3, wherein the second selector assembly comprises a synchromesh selector assembly or a dog clutch selector assembly.

36. A transmission system including:
a first input shaft that is arranged to receive drive directly from a drive source, and a second input shaft that is arranged to receive drive from the drive source via a drive interruption means, and
a first gear element rotatable relative to the first input shaft and a first selector assembly for selectively locking the first gear element for rotation with the first input shaft, wherein the selector assembly includes first and second sets of engagement elements that are moveable independently of each other and are moveable into and out of engagement with the first gear element, said sets of engagement members being arranged such that when a braking force is transmitted the first set of engagement members drivingly engages the first gear element, and the second set of engagement members is in an unloaded condition, and when a driving force is transmitted the second set of engagement members drivingly engages the first gear element, and the first set of engagement members is then in an unloaded condition.

37. A drive train including a transmission system according to claim 36, wherein the drive interruption means comprises a friction clutch device.

38. A method for performing a power on down shift including:
   providing a transmission system including a first input shaft that is arranged to receive drive directly from a drive source, and a second input shaft that is arranged to receive drive from a friction clutch device, first and second gear trains, a first gear element rotatable relative to the first input shaft, and a first selector assembly for selectively locking the first gear element for rotation with the first input shaft from operational modes that include the following modes: lock the gear element for rotation with the first input shaft in forward and reverse torque directions, lock the gear element for rotation with the first input shaft in the forward torque direction and not lock in the reverse torque direction; and lock the gear element with rotation with the first input shaft in the reverse torque direction and not lock in the forward torque direction;
   adjusting torque clutch capacity of the friction clutch device to set the clutch device to a slip condition;
   synchronising a drive source speed with the first gear train; reducing clutch torque capacity until substantially no torque is transmitted; and
   synchronising the speed of a transmission side of the friction clutch device with the first gear train.

39. A method according to claim 38, including closing the friction clutch device.

40. A method according to claim 38, including selecting the first gear element and locking it for rotation with the first input shaft.

41. A method according to claim 38, wherein the first gear train includes the first gear element.

42. A method according to claim 38, including providing a second gear element rotatably mounted on the second input shaft and a second selector assembly for selectively locking the second gear element for rotation with the second input shaft, a third gear element rotatably mounted on the first input shaft, wherein the first selector assembly is arranged to selectively lock the third gear element for rotation with the first input shaft from operational modes that include the following modes: lock the gear element for rotation with the first input shaft in forward and reverse torque directions, lock the gear element for rotation with the first input shaft in the forward torque direction and not lock in the reverse torque direction; and lock the gear element with rotation with the first input shaft in the reverse torque direction and not lock in the forward torque direction, and a fourth gear element rotatably mounted on the second input shaft, wherein the second selector assembly is arranged to selectively lock the fourth gear element for rotation with second shaft.

43. A method according to claim 42, wherein the second gear train includes the third gear element.

44. A method according to claim 42, including the first selector assembly disengaging the third gear element when a shift request is made.

45. A method according to claim 38, wherein the first selector assembly engages the first gear element during or after the step of synchronising the drive source speed with the first gear train.

46. A method according to claim 38, wherein the second selector assembly is initially engaged with the first gear element when the shift request is made and disengages the first gear element when synchronising the clutch speed to the speed of the first gear train.

47. A method according to claim 46, wherein the second selector assembly selects the second gear element rotatably mounted on the second input shaft.

48. A method for performing a power on down shift including:
   providing a transmission system including a first input shaft that is arranged to receive drive directly from a drive source, and a second input shaft that is arranged to receive drive from the drive source via a friction clutch device, a first gear train including a first gear element rotatable relative to the first input shaft, and a second gear train, and a selector assembly for selectively locking the first gear element for rotation with the first input shaft from operational modes that include the following modes: lock the gear element for rotation with the first input shaft in forward and reverse torque directions, lock the gear element for rotation with the first input shaft in the forward torque direction and not lock in the reverse torque direction;
   and lock the gear element with rotation with the first input shaft in the reverse torque direction and not lock in the forward torque direction;
   adjusting torque capacity of the friction clutch device to set the clutch device to a slip condition; synchronising the drive source speed to the first gear element;
   selecting the first gear element with the selector assembly; and
   reducing torque capacity of the friction clutch device until there is substantially no torque transmitted thereby handing over torque from the first gear train to the second gear train.

* * * * *